United States Patent
Onishi

(10) Patent No.: US 11,924,385 B2
(45) Date of Patent: Mar. 5, 2024

(54) INFORMATION PROCESSING APPARATUS FOR TRANSMITTING IMAGE DATA

(71) Applicant: SHARP KABUSHIKI KAISHA, Sakai (JP)

(72) Inventor: Takahisa Onishi, Sakai (JP)

(73) Assignee: SHARP KABUSHIKI KAISHA, Sakai (JP)

(*) Notice: Subject to any disclaimer, the term of this patent is extended or adjusted under 35 U.S.C. 154(b) by 0 days.

(21) Appl. No.: 17/705,089

(22) Filed: Mar. 25, 2022

(65) Prior Publication Data

US 2022/0321712 A1    Oct. 6, 2022

(30) Foreign Application Priority Data

Apr. 2, 2021    (JP) .................. 2021-063767

(51) Int. Cl.
*H04N 1/00*        (2006.01)
*G06F 3/12*        (2006.01)

(52) U.S. Cl.
CPC ....... *H04N 1/00206* (2013.01); *G06F 3/1204* (2013.01); *G06F 3/1273* (2013.01); *H04N 1/00212* (2013.01); *H04N 1/00482* (2013.01)

(58) Field of Classification Search
None
See application file for complete search history.

(56) References Cited

U.S. PATENT DOCUMENTS

| 9,846,561 B2 | 12/2017 | Sugita | |
|---|---|---|---|
| 2008/0195663 A1* | 8/2008 | Sekine | G03G 15/502 |
| 2011/0267649 A1* | 11/2011 | Akimoto | H04N 1/00413 |
| | | | 358/1.15 |
| 2015/0281511 A1* | 10/2015 | Furutani | H04N 1/32037 |
| | | | 358/1.14 |
| 2016/0269573 A1* | 9/2016 | Sugita | H04N 1/32641 |
| 2017/0171401 A1* | 6/2017 | Kado | H04N 1/00212 |
| 2017/0171414 A1* | 6/2017 | Naito | H04N 1/00307 |
| 2019/0098166 A1* | 3/2019 | Sugita | H04N 1/00413 |
| 2020/0137260 A1* | 4/2020 | Sugawara | H04N 1/32096 |
| 2020/0322502 A1* | 10/2020 | Tajima | H04N 1/32058 |
| 2021/0006666 A1* | 1/2021 | Kado | H04N 1/00315 |
| 2021/0099605 A1* | 4/2021 | Endo | H04N 1/00408 |
| 2021/0136252 A1* | 5/2021 | Fukuda | H04N 1/4433 |

FOREIGN PATENT DOCUMENTS

JP    2016-167764 A    9/2016

* cited by examiner

*Primary Examiner* — Henok Shiferaw
(74) *Attorney, Agent, or Firm* — ScienBiziP, P.C.

(57) ABSTRACT

An information processing apparatus includes a controller that executes a job using a destination, and a storage that stores a setting value of the job, as history information. The controller applies the setting value to execution of the job, when the history information of the job in which a destination acquired from a terminal device is a transmission destination is stored in the storage.

9 Claims, 21 Drawing Sheets

FIG. 4

| SETTING HISTORY INFORMATION | | | |
|---|---|---|---|
| JOB ID | EXECUTION DATE AND TIME | JOB TYPE | SETTING VALUES |
| 1 | 2020/04/01 9:00 | COPY | COLOR MODE: FULL COLOR, DOCUMENT: A4, PAPER: A4, MAGNIFICATION: 100, ······ |
| 2 | 2020/04/01 11:00 | E-mail TRANSMISSION | TRANSMISSION DESTINATION: aiueo@sample.com, COLOR MODE: FULL COLOR, RESOLUTION: 200x200dpi, FORMAT: PDF, ······ |
| 3 | 2020/04/01 13:10 | FAX TRANSMISSION | TRANSMISSION DESTINATION: 55-6666-7777, IMAGE QUALITY: NORMAL CHARACTERS, DENSITY: DARK, ······ |
| 4 | 2020/04/02 13:30 | E-mail TRANSMISSION | TRANSMISSION DESTINATION: aiueo@sample.com, COLOR MODE: BLACK AND WHITE, RESOLUTION: 200x200dpi, FORMAT: TIFF, ······ |
| 5 | 2020/04/02 13:40 | E-mail TRANSMISSION | TRANSMISSION DESTINATION: aaaaa@sample.com, COLOR MODE: FULL COLOR, RESOLUTION: 400x400dpi, FORMAT: PDF, ······ |
| 6 | 2020/04/02 13:50 | FAX TRANSMISSION | TRANSMISSION DESTINATION: 22-3333-4444, IMAGE QUALITY: NORMAL CHARACTERS, DENSITY: AUTOMATIC, ······ |
| 7 | 2020/04/03 10:00 | E-mail TRANSMISSION | TRANSMISSION DESTINATION: tachi@sample.com, COLOR MODE: FULL COLOR, RESOLUTION: 400x400dpi, FORMAT: PDF, ······ |

FIG. 6

| DESTINATION INFORMATION | | | | |
|---|---|---|---|---|
| ID | DESTINATION NAME | E-mail ADDRESS | FAX NUMBER | TEL NUMBER |
| 1 | AI UEO | aiueo@sample.com | 00-1111-2222 | aa-bbbb-cccc |
| 2 | KAKIKU KEKO | kakiku@sample.com | 33-4444-5555 | dd-eeee-ffff |
| 3 | SASHISU SESO | sashisu@sample.com | 66-7777-8888 | gg-hhhh-iiii |
| 4 | TACHI TSUTETO | tachi@sample.com | 99-0000-1111 | jj-kkkk-llll |
| 5 | NANI NUNENO | nani@sample.com | 22-3333-4444 | mm-oooo-pppp |

FIG. 12

| JOB ID | JOB TYPE | EXECUTION DATE AND TIME | SETTING VALUES |
|---|---|---|---|
| 2 | E-mail TRANSMISSION | 2020/04/01 11:00 | TRANSMISSION DESTINATION: aiueo@sample.com, COLOR MODE: FULL COLOR, RESOLUTION: 200×200dpi, FORMAT: PDF, ...... |
| 4 | E-mail TRANSMISSION | 2020/04/02 13:30 | TRANSMISSION DESTINATION: aiueo@sample.com, COLOR MODE: BLACK AND WHITE, RESOLUTION: 200×200dpi, FORMAT: TIFF, ...... |

FIG. 16

SETTING HISTORY INFORMATION

| JOB ID | EXECUTION DATE AND TIME | JOB TYPE | SETTING VALUES | ATTACHED DATA |
|---|---|---|---|---|
| 1 | 2020/04/01 9:00 | COPY | COLOR MODE: FULL COLOR, DOCUMENT: A4, PAPER: A4, MAGNIFICATION: 100, ⋯⋯ | |
| 2 | 2020/04/01 11:00 | E-mail TRANSMISSION | TRANSMISSION DESTINATION: aiueo@sample.com, COLOR MODE: FULL COLOR, RESOLUTION: 200x200dpi, FORMAT: PDF, ⋯⋯ | DATA B |
| 3 | 2020/04/01 13:10 | FAX TRANSMISSION | TRANSMISSION DESTINATION: 55-6666-7777, IMAGE QUALITY: NORMAL CHARACTERS, DENSITY: DARK, ⋯⋯ | |
| 4 | 2020/04/02 13:30 | E-mail TRANSMISSION | TRANSMISSION DESTINATION: aiueo@sample.com, COLOR MODE: BLACK AND WHITE, RESOLUTION: 200x200dpi, FORMAT: TIFF, ⋯⋯ | DATA A |
| 5 | 2020/04/02 13:40 | E-mail TRANSMISSION | TRANSMISSION DESTINATION: aaaaa@sample.com, COLOR MODE: FULL COLOR, RESOLUTION: 400x400dpi, FORMAT: PDF, ⋯⋯ | |
| 6 | 2020/04/02 13:50 | FAX TRANSMISSION | TRANSMISSION DESTINATION: 22-3333-4444, IMAGE QUALITY: NORMAL CHARACTERS, DENSITY: AUTOMATIC, ⋯⋯ | |
| 7 | 2020/04/03 10:00 | E-mail TRANSMISSION | TRANSMISSION DESTINATION: tachi@sample.com, COLOR MODE: FULL COLOR, RESOLUTION: 400x400dpi, FORMAT: PDF, ⋯⋯ | |

INFORMATION PROCESSING APPARATUS FOR TRANSMITTING IMAGE DATA

BACKGROUND OF THE INVENTION

Field of the Invention

The present invention relates to an information processing apparatus and the like.

Description of the Background Art

Some information processing apparatuses such as multi-function machines have a function of acquiring destination information including destinations such as mail addresses and fax numbers to be managed by terminal devices such as smartphones, tablets, mobile phones, or personal computers. It is known that some of these information processing apparatuses can transmit image data also to a destination that is not managed by the own apparatus by setting, as a transmission destination pertaining to a job such as, for example, a scan to e-mail function, and a scan to fax function, a destination included in destination information acquired from a terminal device.

By the way, in order to facilitate execution of a job that is the same as or similar to a job that has been executed in the past, an attempt has been made to reuse setting values pertaining to the job by storing the setting values as setting history information. For example, setting history information is selectably displayed on a display device, and a user can easily execute a job by selecting desired setting history information, and changing setting values as necessary.

For example, Japanese Unexamined Patent Application Publication No. 2016-167764 discloses an image processing apparatus that, when a transmission job, which is a job of transmitting image data, is executed, controls whether settings pertaining to execution of the transmission job are stored as setting history information according to a user's intention.

From a viewpoint of security, it is often the case that destination information acquired from a terminal device is deleted from a storage device after a job is executed. Herein, for example, when a user wants to re-execute a transmission job in which a same destination is a transmission destination, the user needs to acquire destination information from a terminal device again, and reconfigure settings pertaining to a job.

An object of the present disclosure is to provide an information processing apparatus, and the like that can efficiently execute a job based on a destination acquired from a terminal device without performing a same setting operation many times.

SUMMARY OF THE INVENTION

In order to solve the above problem, an information processing apparatus according to the present disclosure includes a controller that executes a job using a destination; and a storage that stores a setting value of the job, as history information. The controller applies the setting value to execution of the job, when the history information of the job in which a destination acquired from a terminal device is a transmission destination is stored in the storage.

Also, an information processing method according to the present disclosure includes: executing a job using a destination; storing a setting value of the job in a storage, as history information; acquiring a destination from a terminal device; determining whether the history information of the job in which a destination acquired from the terminal device is a transmission destination is stored in the storage; and applying the setting value to execution of the job, when it is determined that the history information of the job in which a destination acquired from the terminal device is a transmission destination is stored in the storage.

According to the present disclosure, it is possible to provide an information processing apparatus and the like that can efficiently execute a job based on a destination acquired from a terminal device without repeating a same setting operation.

BRIEF DESCRIPTION OF THE DRAWINGS

FIG. 4 is a diagram illustrating a configuration example of setting history information according to the first embodiment.

FIG. 6 is a diagram illustrating a configuration example of destination information according to the first embodiment.

FIG. 12 is a diagram illustrating an operation example according to the first embodiment.

FIG. 16 is a diagram illustrating a configuration example of setting history information according to the second embodiment.

DESCRIPTION OF THE PREFERRED EMBODIMENTS

In the following, embodiments according to the present disclosure are described with reference to the drawings. In the present disclosure, a multifunction machine having a copy function, a scan function, a scan to e-mail function, a scan to fax function, and the like is described as an embodiment of an information processing apparatus. Note that, the following embodiments are examples for describing the present disclosure, and the technical scope of the description defined in the claims is not limited to the following description.

1. First Embodiment

A first embodiment is directed to a multifunction machine capable of executing a job using a destination, and storing history information of the job. When history information in which a destination acquired from a terminal device is a transmission destination is stored in a storage, the multifunction machine applies a setting value of the history information to execution of a job.

1.1 Functional Configuration

Figure 1:
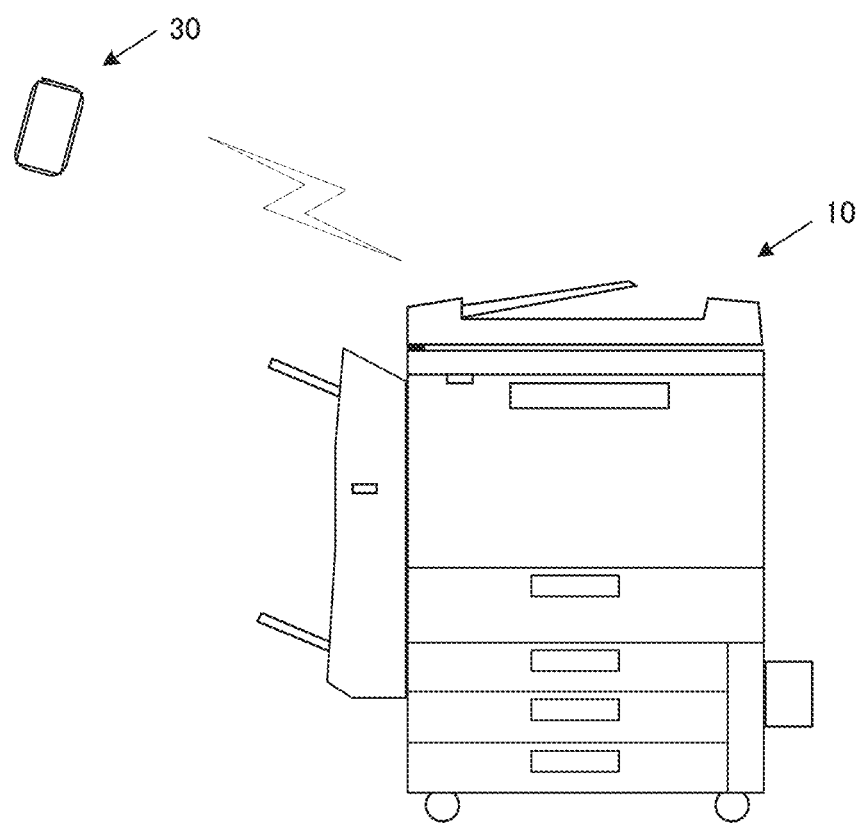
FIG. 1 is a diagram schematically illustrating an overall configuration of a multifunction machine according to a first embodiment.

FIG. 1 is a diagram schematically illustrating an overall configuration of a multifunction machine 10 according to the first embodiment. The multifunction machine 10 is configured to be connectable to a terminal device 30. Note that, in the present disclosure, a term "connection" represents a state in which the multifunction machine 10 and the terminal device 30 establish connection through communication, and are able to mutually transmit and receive information.

Herein, a connection method is not specifically limited, but a communication technique such as, for example, Bluetooth (registered trademark), near field communication (NFC), Wi-fi (registered trademark), ZigBee (registered trademark), Irda, and a wireless USB can be adopted. Note that, FIG. 1 illustrates a configuration in which the multifunction machine 10 is directly connected to the terminal device 30. However, it is also possible to connect through an unillustrated network such as a local area network (LAN), a wide area network (WAN), and the Internet.

Further, there is also no restriction on the number of terminal devices 30 connectable to the multifunction machine 10. When a plurality of terminal devices 30 are connectable to the multifunction machine 10, each of the terminal devices 30 may have a same functional configuration or may have a different functional configuration.

Figure 2:
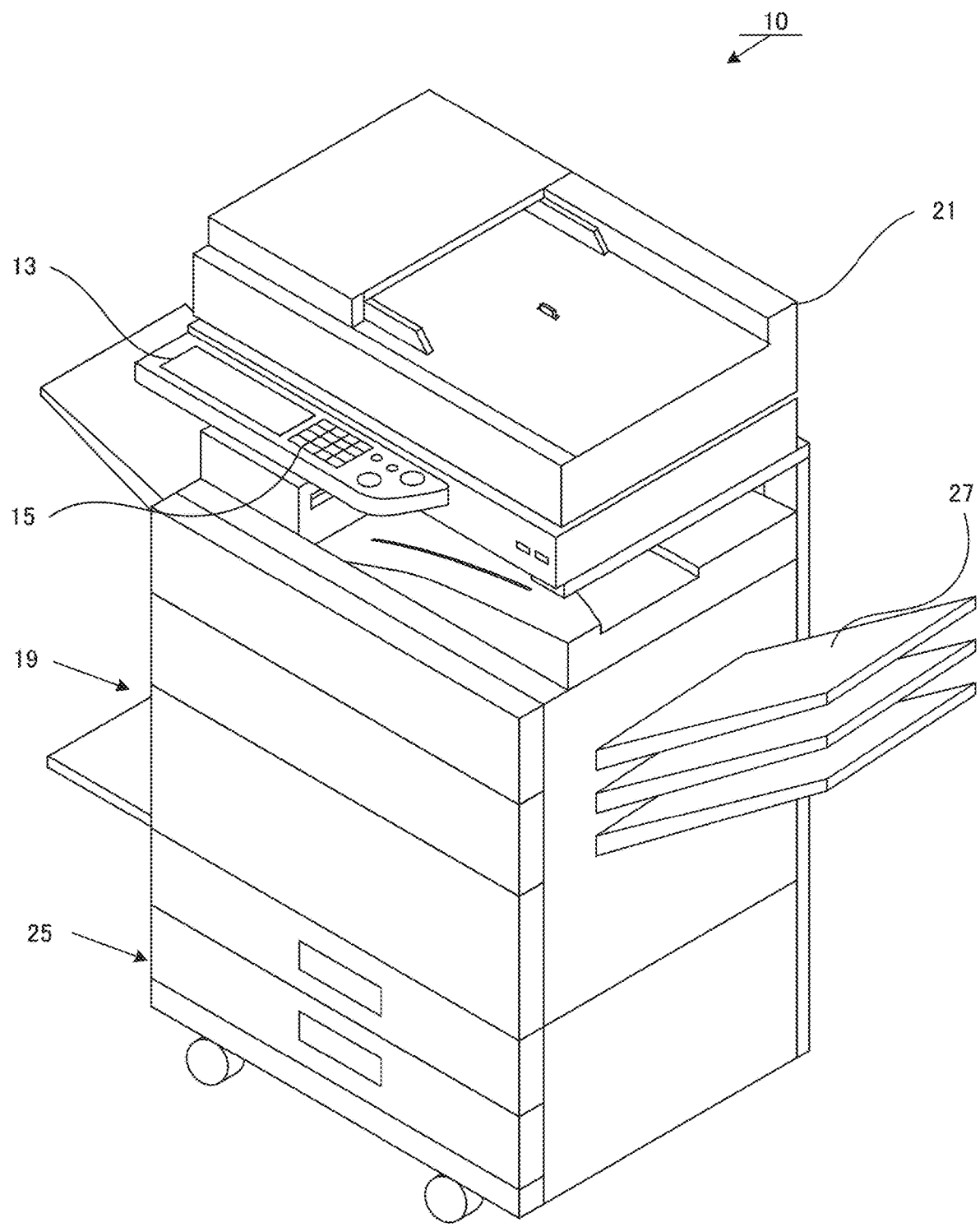
FIG. 2 is an external perspective view illustrating the overall configuration of the multifunction machine according to the first embodiment.
Figure 3:
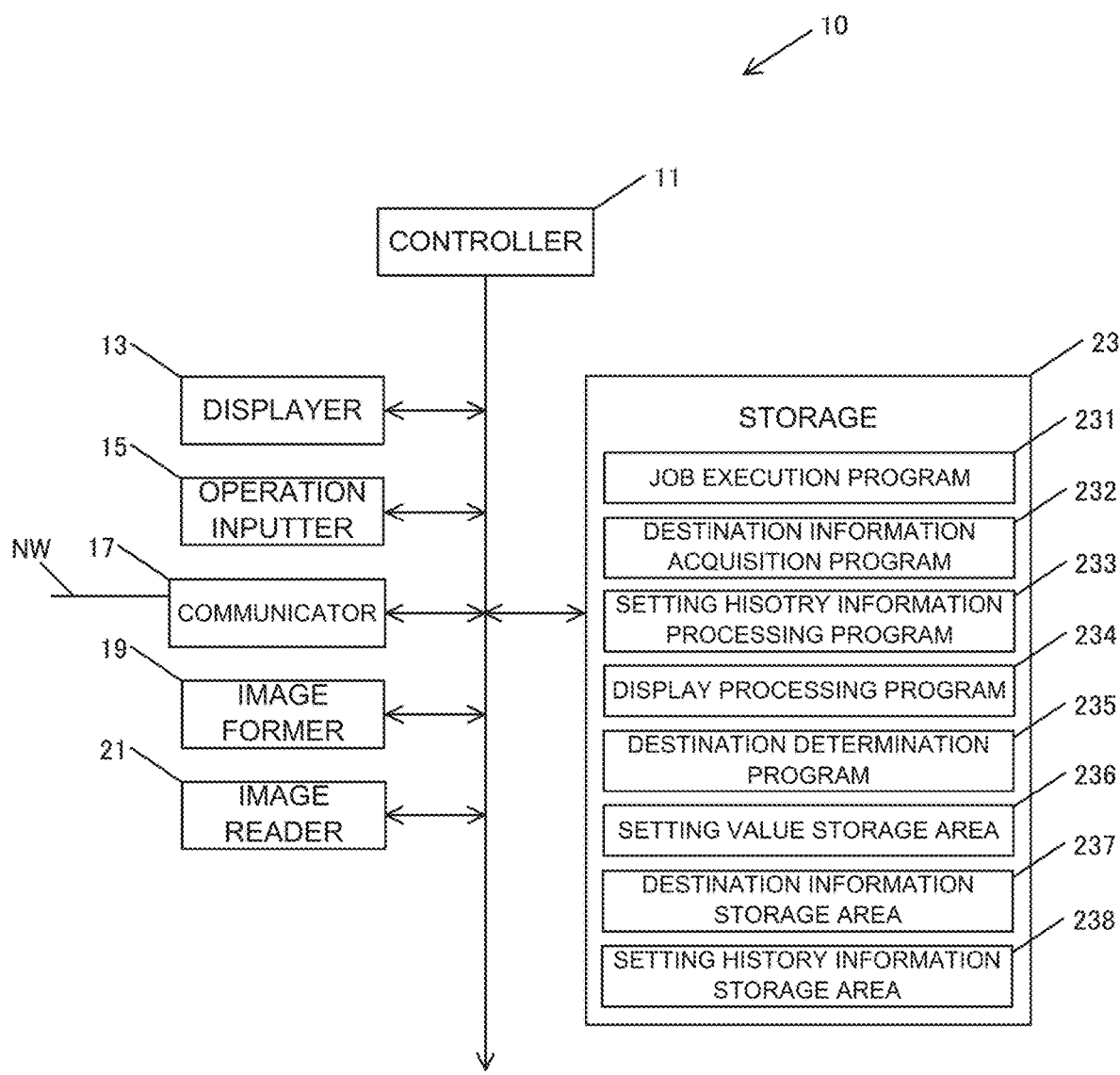
FIG. 3 is a diagram illustrating a functional configuration of the multifunction machine according to the first embodiment.

FIG. 2 is an external perspective view illustrating an overall configuration of the multifunction machine 10. FIG. 3 is a functional configuration diagram of the multifunction machine 10. The multifunction machine 10 includes a controller 11, a displayer 13, an operation inputter 15, a communicator 17, an image former 19, an image reader 21, and a storage 23.

The controller 11 controls the entirety of the multifunction machine 10. The controller 11 is configured of, for example, one or more arithmetic devices (such as a central processing unit (CPU)). The controller 11 achieves its function by reading and executing various programs stored in the storage 23.

The displayer 13 displays various pieces of information to a user or others. The displayer 13 can be configured of, for example, a liquid crystal display (LCD), an organic electroluminescence (EL) display, or the like.

The operation inputter 15 accepts an input of information by a user or others. The operation inputter 15 can be configured of hard keys (e.g., a numeric keypad), buttons, and the like. Note that, the operation inputter 15 can be configured as a touch panel that allows an input via the displayer 13. In this case, as an input detection method of a touch panel, for example, a method such as a resistive film method, an infrared method, an electromagnetic induction method, and an electrostatic capacitance method can be employed.

The communicator 17 includes, as described above, a wireless communication interface such as Bluetooth, NFC, Wi-fi, ZigBee, Irda, and a wireless USB. In addition to the above, the communicator 17 can also include either one or both of wired/wireless interfaces for communicating with another device via an unillustrated network such as a LAN, a WAN, the Internet, a telephone line, and a fax line.

The image former 19 forms an image based on image data on paper as a recording medium. The image former 19 feeds paper from a paper feeder 25, forms an image based on image data on the paper, and then discharges the paper to a paper discharger 27. The image former 19 can be configured of, for example, a laser printer or the like using an electrophotographic method. The image former 19 performs image formation by using toner supplied from unillustrated toner cartridges associated with toner colors (e.g., cyan (C), magenta (M), yellow (Y), and black (K)).

The image reader 21 generates image data by scanning and reading a document image to be read. The image reader 21 can be configured, for example, as a scanner device including an image sensor such as a charge coupled device (CCD), and a contact image sensor (CIS). There is no restriction on a configuration of the image reader 21, as long as the image reader 21 is configured to generate image data by reading a reflected light image from a document image with use of an image sensor.

The storage 23 stores various programs necessary for an operation of the multifunction machine 10, and various pieces of data. The storage 23 can be configured of a storage device such as, for example, a random access memory (RAM), a hard disk drive (HDD), a solid state drive (SSD), and a read only memory (ROM).

In the first embodiment, the storage 23 stores a job execution program 231, a destination information acquisition program 232, a setting history information processing program 233, a display processing program 234, and a destination determination program 235, and secures a setting value storage area 236, a destination information storage area 237, and a setting history information storage area 238.

The job execution program 231 is a program to be read by the controller 11 to perform processing accompanied by execution of a copy function, a scan function, a scan to e-mail function, a scan to fax function, and the like in a unit of a job. The controller 11 that has read the job execution program 231 executes a job by controlling each part involved in execution of the job, such as the displayer 13, the operation inputter 15, the communicator 17, the image former 19, or the image reader 21. In addition, the controller 11 that has read the job execution program 231 can execute various jobs, based on a setting value stored as setting history information to be described later.

The destination information acquisition program 232 is a program to be read by the controller 11, when receiving a request for acquiring a destination by a user. The controller 11 that has read the destination information acquisition program 232 requests the terminal device 30 to output destination information including a destination such as a mail address, a fax number, or a telephone number managed by the terminal device 30. There is no particular restriction on a means for acquiring destination information, but it is possible to use a phone book transfer profile such as, for example, a phone book access profile (PBAP), an object push profile (OPP), and the like.

The setting history information processing program 233 is a program to be read by the controller 11, when, for example, performing acquisition of a setting value and the like pertaining to execution of a job, generation of setting history information, and various processing with respect to setting history information. The controller 11 that has read the setting history information processing program 233 acquires a setting value pertaining to execution of a job, and stores the setting value in the setting value storage area 236. In addition, the controller 11 generates setting history information, based on the acquired setting value, and stores the setting history information in the setting history information storage area 238.

The display processing program 234 is a program to be read by the controller 11, when displaying, on the displayer 13, a setting history information screen, a job execution screen, a home screen, or the like. The controller 11 that has read the display processing program 234 displays, on the displayer 13, various screens such as a setting history information screen, a job execution screen, or a home screen according to unillustrated frame information, content layout information, or the like.

The destination determination program 235 is a program to be read by the controller 11, when determining whether setting history information of a job in which a destination included in destination information acquired from the terminal device 30 is a transmission destination is stored in the setting history information storage area 238. The controller 11 performs destination determination processing by comparing a destination included in destination information read from the destination information storage area 237 with a destination included in setting history information read from the setting history information storage area 238.

The setting value storage area 236 is a storage area that stores setting values pertaining to execution of a job. The setting values include, for example, setting values set by a user, such as a color mode, a document/paper size, a magnification, a density, an image quality, a resolution, and a format, and setting values related to image formation and the like such as device default values held by the device itself. Note that, the controller 11 stores, in the setting value storage area 236, a destination set at a time of executing a transmission job, as a setting value.

The destination information storage area 237 is a storage area that stores destination information acquired from the terminal device 30. A destination included in destination information stored in the destination information storage area 237 is read by the controller 11, and used for destination determination processing.

The setting history information storage area 238 is a storage area that stores setting history information in a data table format. Setting history information according to the present disclosure can be configured as history information attached with an identifier such as a job ID for uniquely identifying information, which is configured of combination of information related to a job execution history, such as, for example, an execution date and time, and a type of an executed job, and a part or all of setting values stored in the setting value storage area 236. Setting history information stored in the setting history information storage area 238 is read by the controller 11, and used for destination determination processing and execution of a job.

FIG. 4 is a diagram illustrating a configuration example of setting history information according to the first embodiment. For example, setting history information of the job ID "1" represents an executed job in which a job type is "copy", and an execution date and time is "Apr. 1, 2020, 9;00". Setting values include setting values related to image formation such as, for example, a color mode, a document/paper size, a density, an image quality, a resolution, a magnification, or a data format, and are setting values pertaining to job execution stored in the setting value storage area 236. Setting history information of the job ID "1" includes setting values such as a color mode: full color, a document size: A4, a paper size: A4, and a magnification: 100 (equal size). Note that, setting values illustrated in FIG. 4 are only an example, and setting values in the present disclosure are not limited only to those illustrated in FIG. 4.

Setting history information of the job ID "2" represents an executed job in which a job type is "e-mail transmission", and an execution date and time is "Apr. 1, 2020, 11:00". Setting history information of the job ID "2" includes destination information "aiueo@sample.com", in addition to setting values such as a color mode: full color, a resolution: 200×200 dpi, and a format: PDF.

Setting history information of the job ID "3" represents an executed job in which a job type is "fax transmission", and an execution date and time is "Apr. 1, 2020, 13:10". Setting history information of the job ID "3" includes destination information "55-6666-7777", in addition to setting values such as an image quality: normal characters, and a density: dark.

Setting history information of the job ID "4" represents an executed job in which a job type is "e-mail transmission", and an execution date and time is "Apr. 2, 2020, 13:30". Setting history information of the job ID "4" includes destination information "aiueo@sample.com", in addition to setting values such as a color mode: black and white, a resolution: 200×200 dpi, and a format: TIFF.

Setting history information of the job ID "5" represents an executed job in which a job type is "e-mail transmission", and an execution date and time is "Apr. 2, 2020, 13:40". Setting history information of the job ID "5" includes destination information "aaaaa@sample.com", in addition to setting values such as a color mode: full color, a resolution: 400×400 dpi, and a format: PDF.

Setting history information of the job ID "6" represents an executed job in which a job type is "fax transmission", and an execution date and time is "Apr. 2, 2020, 13:50". Setting history information of the job ID "6" includes destination information "22-3333-4444", in addition to setting values such as an image quality: normal characters, and a density: automatic.

Setting history information of the job ID "7" represents an executed job in which a job type is "e-mail transmission", and an execution date and time is "Apr. 3, 2020, 10:00". Setting history information of the job ID "7" includes destination information "tachi@sample.com" in addition to setting values such as a color mode: full color, a resolution: 400×400 dpi, and a format: PDF.

Figure 5:
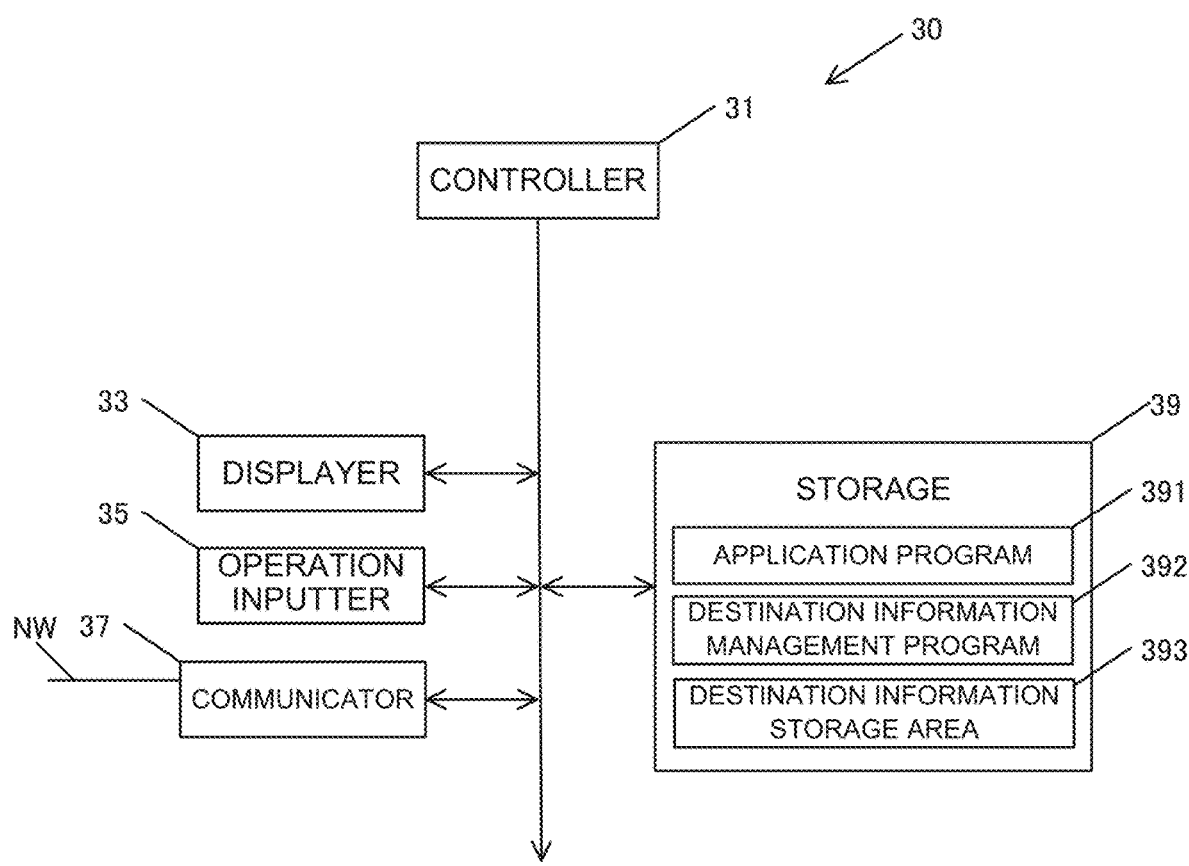
FIG. 5 is a diagram illustrating a functional configuration of a terminal device according to the first embodiment.

FIG. 5 is a diagram illustrating a functional configuration of the terminal device 30. The terminal device 30 according to the present disclosure is a so-called mobile terminal device such as, for example, a smartphone, a tablet, a mobile phone, and a notebook computer, but is not limited thereto. As long as the environment is an environment capable of communicating with the multifunction machine 10, an installation type terminal device such as a desktop personal computer is also included in the terminal device according to the present disclosure.

The terminal device 30 as described above includes a controller 31, a displayer 33, an operation inputter 35, a communicator 37, and a storage 39.

The controller 31 controls the entirety of the terminal device 30. The controller 31 is configured of, for example, one or more arithmetic devices (such as a CPU). The controller 31 achieves its function by reading and executing various programs stored in the storage 39.

The displayer 33 displays various pieces of information to a user. The displayer 33 can be configured of, for example, an LCD, an organic EL display, or the like.

The operation inputter 35 accepts an input of information by a user or others. The operation inputter 35 can be configured as a touch panel that allows an input via the displayer 33. In this case, as an input detection method of a touch panel, for example, a method such as a resistive film method, an infrared method, an electromagnetic induction method, and a capacitance method can be employed.

The communicator 37 includes a communication interface such as Bluetooth, NFC, Wi-fi, ZigBee, Irda, and a wireless USB. In addition to the above, the communicator 37 can also include either one or both of wired/wireless interfaces for communicating with another device via an unillustrated network such as a LAN, a WAN, the Internet, a telephone line, and a fax line.

The storage 39 stores various programs necessary for an operation of the terminal device 30, and various pieces of data. The storage 39 can be configured of a storage device such as, for example, a RAM, an HDD, an SSD, and a ROM.

In the first embodiment, the storage 39 stores an application program 391 and a destination information management program 392, and secures a destination information storage area 393.

The application program 391 is a program to be read by the controller 31, when executing various applications, such as, for example, mails, fax, calls, SNS, video and music viewing, and games.

The destination information management program 392 is a program to be read by the controller 31, when managing destinations such as mail addresses, fax numbers, and telephone numbers of destinations to be used in applications such as mails, fax, and calls. The controller 31 performs processing related to destination information such as new registration, editing, and deletion, based on an instruction by a user. Further, the controller 31 reads and outputs destination information to be managed in response to a request from the controller 11 of the multifunction machine 10. When a request for acquiring destination information is made based on a profile such as, for example, PBAP or OPP, the controller 31 can output the destination information in a vCard format. Note that, destination information can also be written in a CSV format. Note that, the destination information management program 392 may be implemented as a management program incorporated in the application program 391.

The destination information storage area 393 is a storage area that stores destination information in which identification information such as, for example, user names and IDs are associated with destinations such as mail addresses, fax numbers, and telephone numbers.

FIG. 6 is a diagram illustrating a configuration example of destination information. For example, destination information of the ID "1" is such that an e-mail address "aiueo@sample.com", a fax number "00-1111-2222", and a telephone number "aa-bbbb-cccc" as a destination are associated with a destination name "ai ueo".

Likewise, for example, destination information of the ID "4" is such that an e-mail address "tachi@sample.com", a fax number "99-0000-1111", and a telephone number "jj-kkkk-llll" as a destination are associated with a destination name "tachi tsuteto".

Note that, destination information illustrated in FIG. 6 is only an example, and destination information in the present disclosure is not limited to that in FIG. 6.

1.2 Flow of Processing

Figure 7:
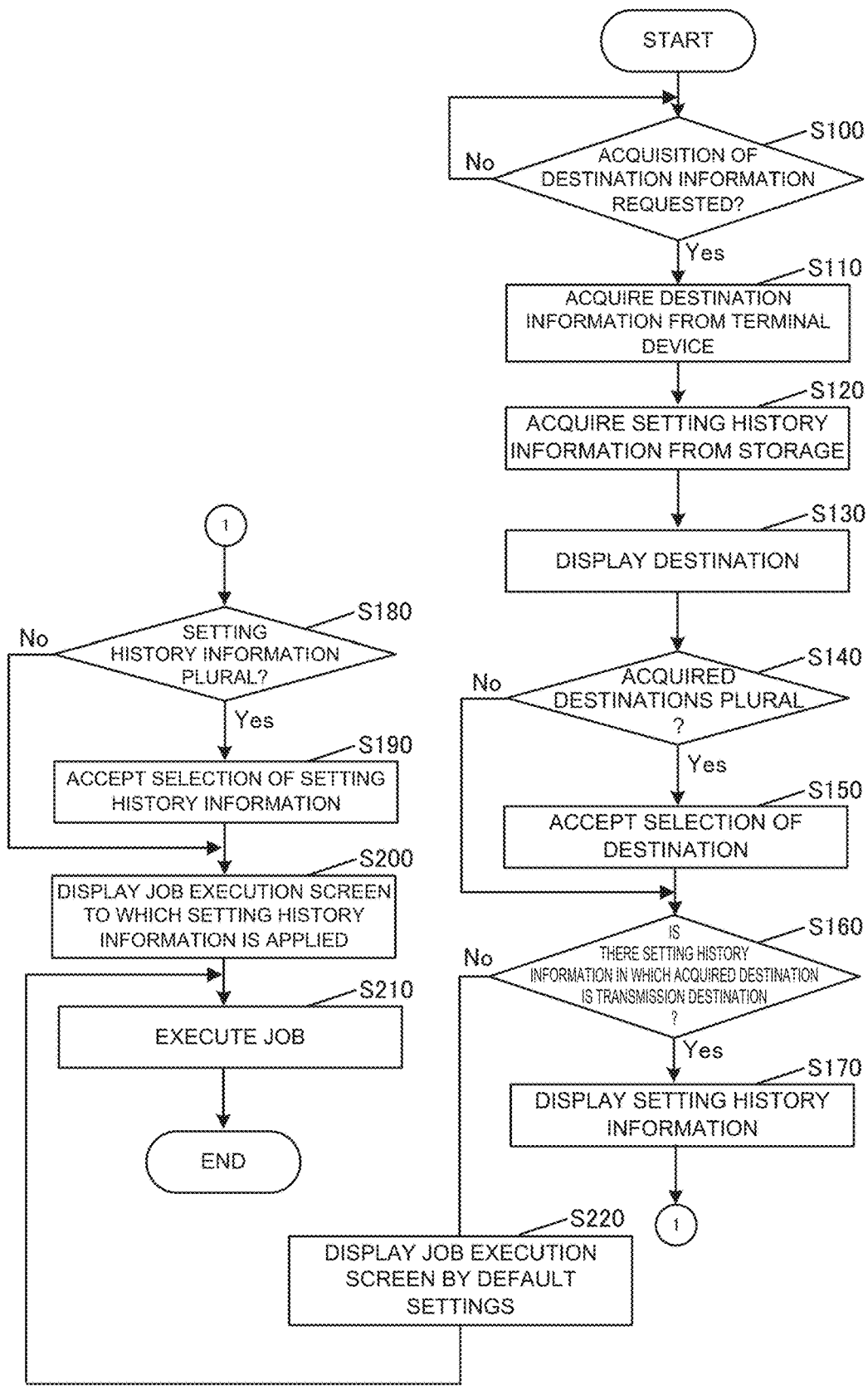
FIG. 7 is a flowchart illustrating a flow of processing according to the first embodiment.

Next, a flow of processing according to the first embodiment is described. FIG. 7 is a flowchart illustrating a flow of processing by the multifunction machine 10. The controller 11 of the multifunction machine 10 achieves processing in each step by reading the job execution program 231, the destination information acquisition program 232, the setting history information processing program 233, the display processing program 234, or the destination determination program 235.

First, the controller 11 of the multifunction machine 10 determines whether acquisition of a destination is requested by a user (Step S100). When it is determined that acquisition of destination information is requested by a user, the controller 11 acquires destination information from the terminal device 30 (Step S100; Yes→Step S110).

At this occasion, the controller 11 requests the controller 31 of the terminal device 30 to output destination information including a destination such as a mail address, a fax number, or a telephone number. In response to the request, the controller 31 outputs destination information stored in the destination information storage area 393 to the multifunction machine 10.

Next, the controller 11 acquires setting history information from the setting history information storage area 238 of the storage 23 (Step S120).

The controller 11 displays, on the displayer 13, a destination (e.g., an e-mail address) included in the destination information acquired in Step S110 (Step S130).

Next, the controller 11 determines whether a destination acquired from the terminal device 30 is plural (Step S140). When the destination acquired from the terminal device 30 is plural, the controller 11 accepts selection of a destination by the user (Step S140; Yes→Step S150). On the other hand, when the acquired destination is not plural, the controller 11 proceeds the processing to Step S160 (Step S140; No→Step S160).

The controller 11 determines whether there is setting history information in which the acquired destination is a transmission destination (Step S160). When there is associated setting history information, the controller 11 displays the setting history information on the displayer 13 (Step S160; Yes→Step S170).

Next, the controller 11 determines whether there are a plurality of associated pieces of setting history information (Step S180). When there are a plurality of associated pieces of setting history information, the controller 11 accepts selection of setting history information by the user (Step S180; Yes→Step S190). On the other hand, when there is no plurality of associated pieces of setting history information, the controller 11 proceeds the processing to Step S200 (Step S180; No→Step S200).

Then, the controller 11 displays, on the displayer 13, a job execution screen to which setting values of one piece of setting history information selected in Step S190, or setting history information in a case where there is one piece of associated setting history information in Step S180 (Step S180; No) are applied (Step S200). When a job execution instruction is received via the displayed job execution screen, the controller 11 executes a job (Step S210), and terminates the processing.

At this occasion, the number of times of application of setting history information to execution of a job may be accumulated. The accumulation result can be used, for example, in display processing of setting history information in Step S180 and the like. In display processing in Step S180, by displaying setting history information in a descending order of the number of times of application, the user can easily recognize setting history information in which the number of times of application is large, specifically, a frequency of use is high. Further, for example, it is also possible to set a predetermined threshold value with respect to the number of times of application, and delete, from the setting history information storage area 238, setting history information in which the number of times of application is less than the threshold value. This prevents accumulation of useless setting history information, and avoids a storage capacity of the storage 23 from overflowing.

By the way, when there is no setting history information in which an acquired destination is a transmission destination, the controller 11 displays a job execution screen to which default settings are applied (Step S160; No→Step S220). When a job execution instruction is received via the displayed job execution screen, the controller 11 executes a job (Step S210), and terminates the processing. Note that, as default settings according to the present disclosure, for example, it is possible to use recommended values recommended by a manufacturer of the multifunction machine 10, a consumables supplier, and the like, user setting values set in advance by the user, and the like.

1.3 Operation Example

Figure 8:
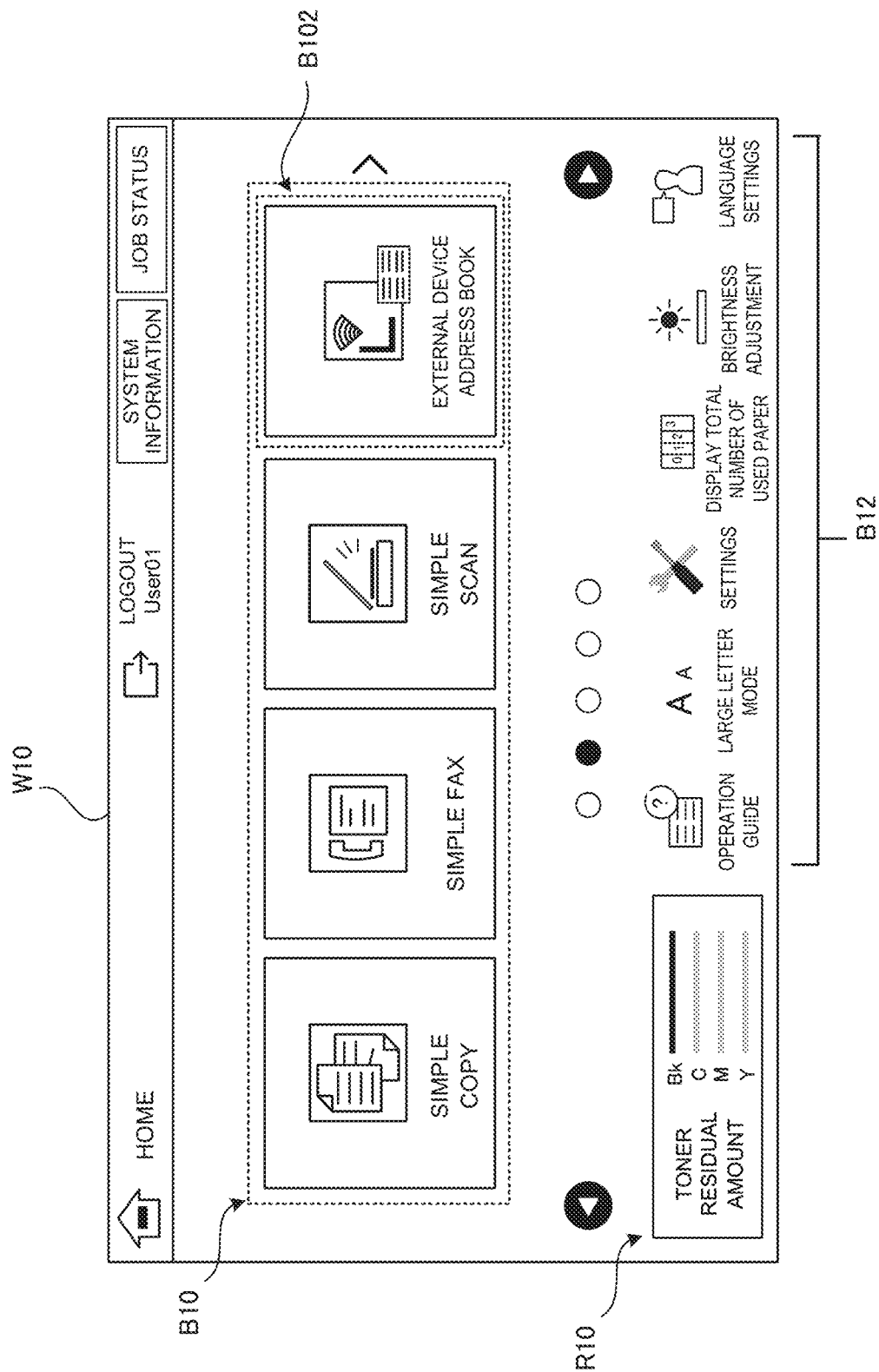
FIG. 8 is a diagram illustrating an operation example according to the first embodiment.

Next, an operation example of the first embodiment is described. FIG. 8 illustrates a configuration example of a home screen to be displayed by the multifunction machine 10. A home screen W10 is, for example, a basic screen that is displayed on the displayer 13, when the power is turned on, when the machine is in a standby mode, when the machine is restored from a sleep mode, and the like, and that accepts an operation input by the user. The user makes a request for acquisition of destination information to the terminal device 30 via the displayed home screen W10.

The home screen W10 includes job selection buttons B10, a device status display area R10, and function selection buttons B12.

The job selection buttons B10 include selection buttons for shifting to a job execution screen of each job, such as, for example, a "simple copy" button, a "simple fax" button, and a "simple scan" button. The job selection buttons B10 also include an "external device address book" button B102. The "external device address book" button B102 is a button that accepts a request for acquisition of an address book as destination information to be managed by an external device such as the terminal device 30. In response to pressing of the "external device address book" button B102, the controller 11 reads the destination information acquisition program 232, thereby acquiring destination information from the terminal device 30.

The device status display area R10 is an area that displays a device status of the multifunction machine 10. The example in FIG. 8 is an example in which a toner residual amount is displayed in the device status display area R10.

The function selection buttons B12 are buttons that accept a changing instruction, a reference instruction, and the like pertaining to function settings of the multifunction machine 10. When the function selection button B12 is pressed, the controller 11 displays an unillustrated each setting screen for executing an associated function changing instruction and reference instruction.

Figure 9:
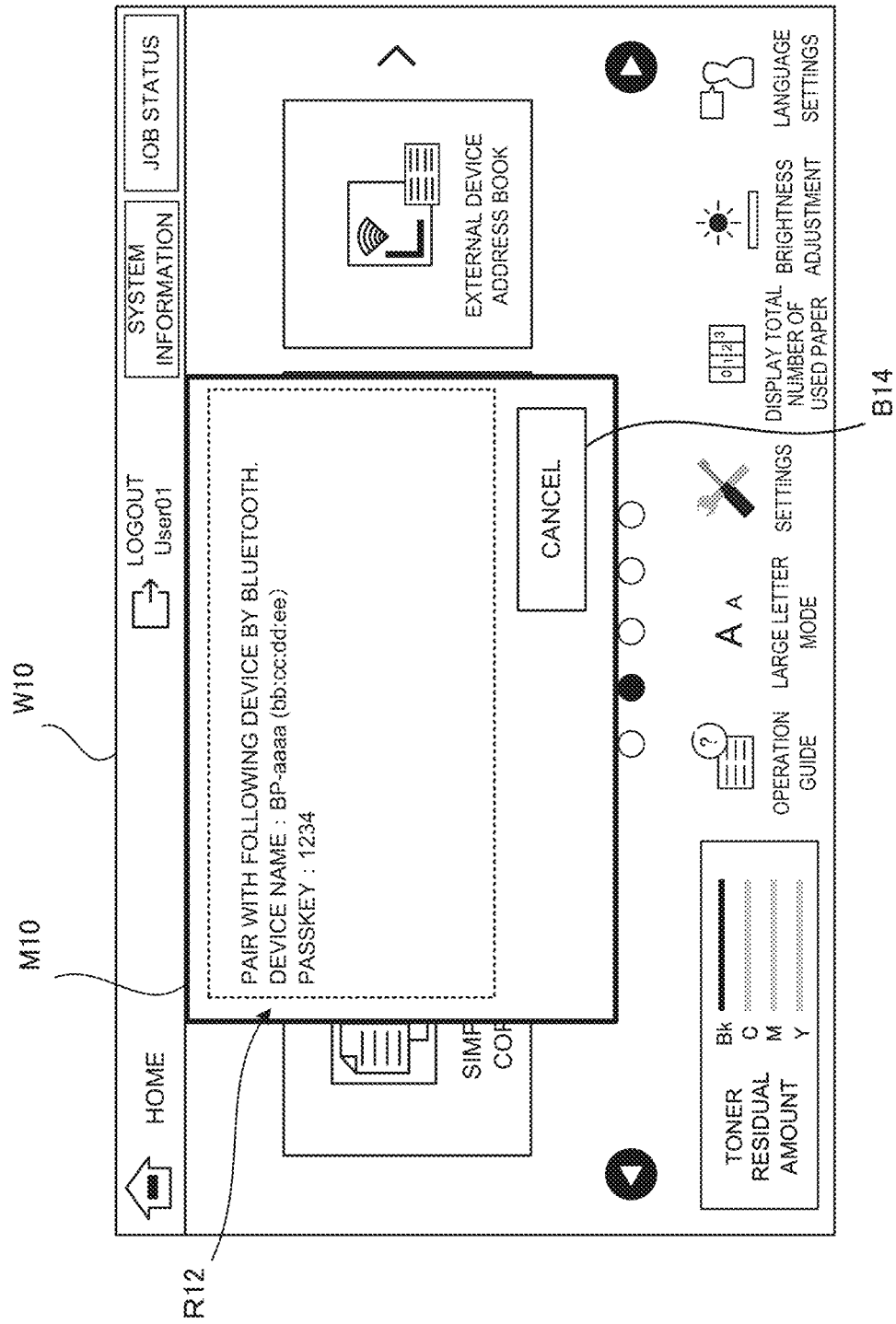
FIG. 9 is a diagram illustrating an operation example according to the first embodiment.

FIG. 9 illustrates a configuration example of a message screen M10 to be displayed on the home screen W10, after the "external device address book" button B102 is pressed and before connection to the terminal device 30 is established (pairing). The message screen M10 includes a message display area R12 and a cancel button B14.

The message screen M10 may have a configuration equivalent to a message screen to be displayed between devices that are trying to connect using general Bluetooth. Specifically, on a message screen, the terminal device 30 to be connected (in the example in FIG. 9, a device name: BP-aaaa (bb:cc:dd:ee)), and a passkey for establishing connection (in the example in FIG. 9, a passkey:1234) are displayed together in the message display area R12. When connection to the device is allowed, the user can establish connection by inputting the passkey. Note that, the cancel button B14 is a button that accepts an input, when connection to the terminal device 30 is not established. In response to pressing of the cancel button B14 by the user, the controller 11 cancels displaying the message screen M10, and also cancels a connecting operation to the terminal device 30.

Figure 10:
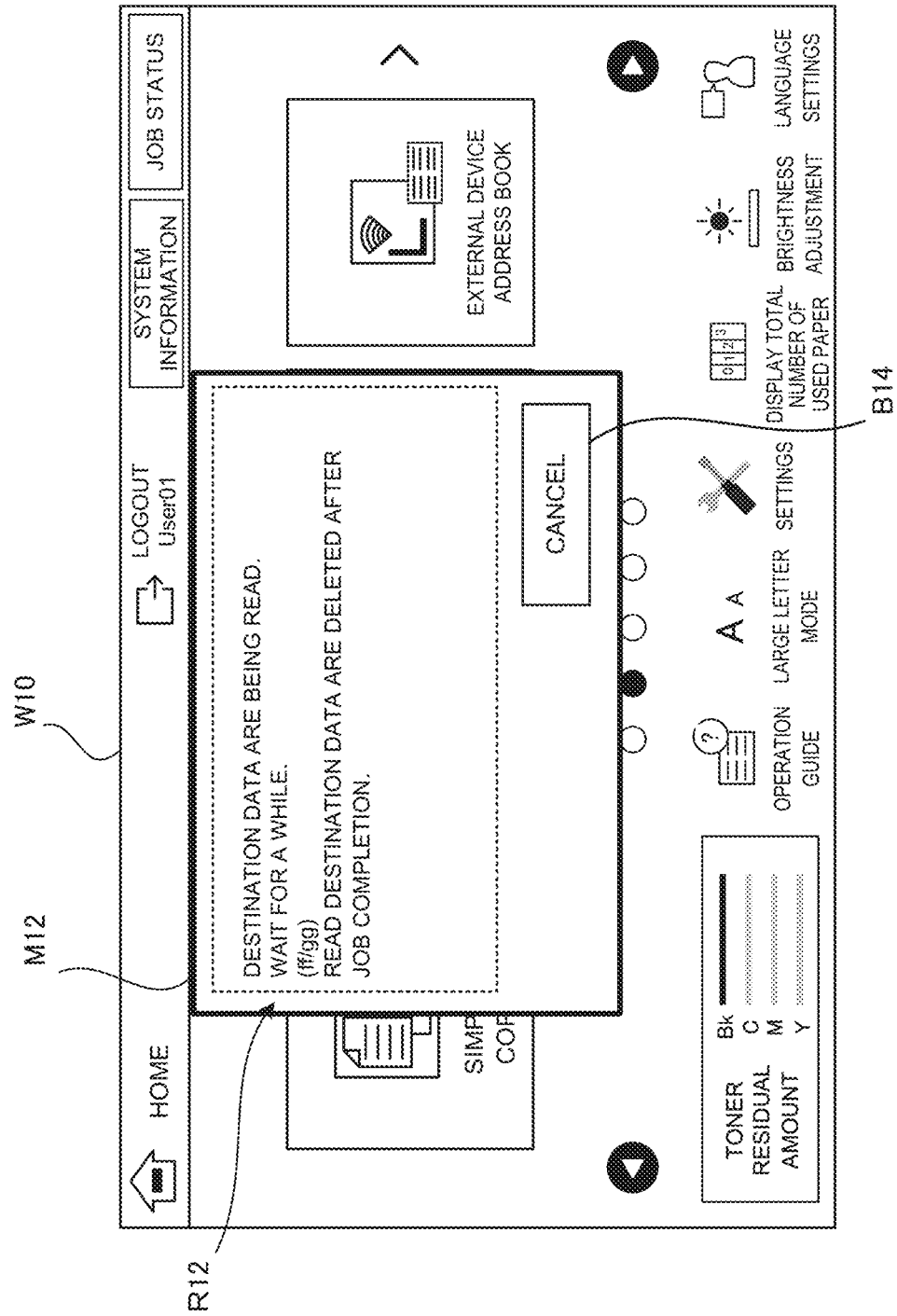
FIG. 10 is a diagram illustrating an operation example according to the first embodiment.

FIG. 10 illustrates a configuration example of a message screen M12 to be displayed on the home screen W10, after connection to the terminal device 30 is established. When connection to the terminal device 30 is established, the controller 11 starts acquiring destination information from the terminal device 30. A message representing an acquisition status on destination information is displayed in the message display area R12 on the message screen M12.

Figure 11:
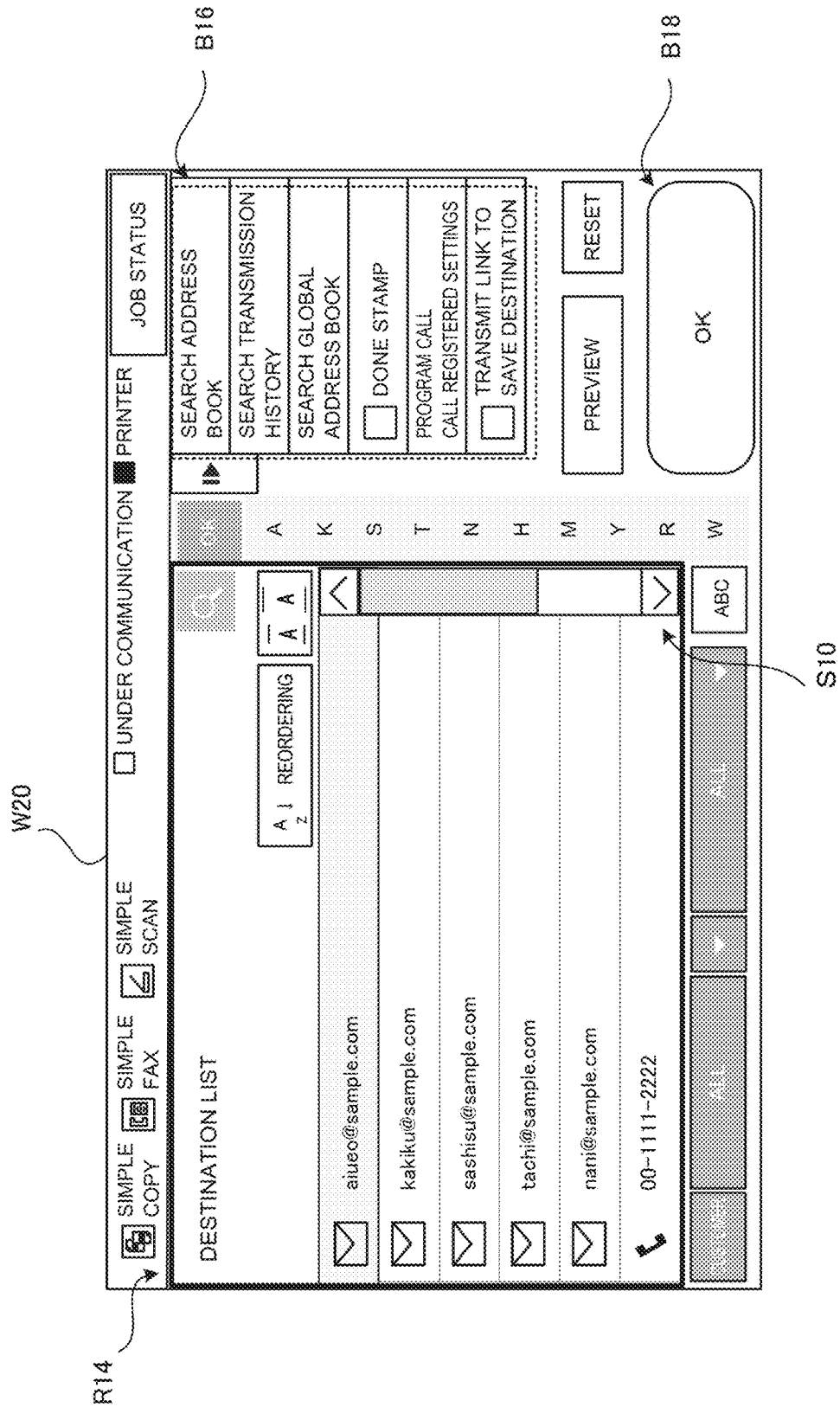
FIG. 11 is a diagram illustrating an operation example according to the first embodiment.

FIG. 11 illustrates a configuration example of a destination display screen W20 that displays destination information acquired from the terminal device 30. The destination display screen W20 includes a destination display area R14, processing selection buttons B16, and an OK button B18.

The destination display area R14 is an area that displays a destination included in destination information acquired from the terminal device 30. FIG. 11 illustrates an example in which an e-mail address, and a part of a fax number as a destination are displayed in destination information (see FIG. 6) acquired from the terminal device 30. Note that, the example in FIG. 11 illustrates that an e-mail address is displayed at a center as a destination. However, by scrolling a scroll bar S10 downward in FIG. 11, it is possible to display an illustrated destination (such as a fax number).

Note that, a destination to be displayed in the destination display area R14 may have a configuration, as illustrated in FIG. 11, in which all destinations included in acquired destination information are displayed, or may limit a destination to be displayed in such a way that, for example, "display only an e-mail address". Furthermore, only a specific destination may be acquired in destination information to be acquired from the terminal device 30 (e.g., "acquire only a fax number", and the like). The destination display area R14 is configured in such a way that it becomes possible to select one destination, when there are a plurality of acquired destinations. FIG. 11 illustrates a manner in which an e-mail address "aiueo@sample.com" is selected by the user from among a plurality of displayed destinations, and the email address is displayed in a blackout state. The controller 11 searches the setting history information storage area 238 by reading the destination determination program 235, based on the destination selected by the user.

The processing selection buttons B16 are buttons that accept selection of processing (action) desired by the user. In the example in FIG. 11, the processing selection buttons B16 include "search address book" button, a "search transmission history" button, a "search global address book" button, and the like. For example, by pressing the "search address book" button, the user can switch a transmission destination pertaining to job execution to a destination based on destination information (address book) managed by the multi-function machine 10.

The OK button B18 is a button that accepts an instruction to determine selection of a destination via the destination display area R14, or an instruction to determine selection of processing via the processing selection button B16. When a specific destination is selected via the destination display area R14, and the OK button B18 is pressed, the controller 11 performs destination determination processing by searching a destination selected by the user in the setting history information storage area 238.

FIG. 12 illustrates a configuration example of a setting history information display screen. The setting history information display screen can be configured as a display screen that displays a destination determination processing result executed by the controller 11. A setting history information display screen W30 includes a search result display area R16, an OK button B20, and a delete button B22.

The search result display area R16 is an area that displays setting history information of a job in which a destination that matches a destination displayed or selected on the destination display screen W20 is a transmission destination. Herein, in the destination display screen W20 in FIG. 11, a case is described as an example, in which an e-mail address "aiueo@sample.com" is selected as a destination. Further, description is made based on a premise that the controller 11 searches the setting history information illustrated in FIG. 4, based on the e-mail address.

When the e-mail address "aiueo@sample.com" is selected as a destination by the user, the controller 11 searches setting history information stored in the setting history information storage area 238, based on the e-mail address.

As illustrated in FIG. 4, setting history information of the job ID "2" and setting history information of the job ID "4" are setting history information pertaining to an e-mail transmission job in which the e-mail address "aiueo@sample.com" is a transmission destination. Therefore, the controller 11 displays, on the search result display area R16, the setting history information of the job ID "2" and the setting history information of the job ID "4", as a search result. As illustrated in FIG. 12, the search result display area R16 is configured in such a way that one piece of setting history information is selectable, when there are a plurality of search results.

The OK button B20 is a button that accepts an instruction to determine selection of setting history information via the search result display area R16. When a specific piece of setting history information is selected via the search result display area R16, and the OK button B20 is pressed, the controller 11 displays an inquiry screen that inquires the user as to whether a setting value pertaining to the setting history information is applied to execution of a job.

The delete button B22 accepts an instruction to delete setting history information in the search result display area R16. When a specific piece of setting history information is selected via the search result display area R16, and the delete button B22 is pressed, the controller 11 deletes the setting history information from the search result display area R16.

Figure 13:
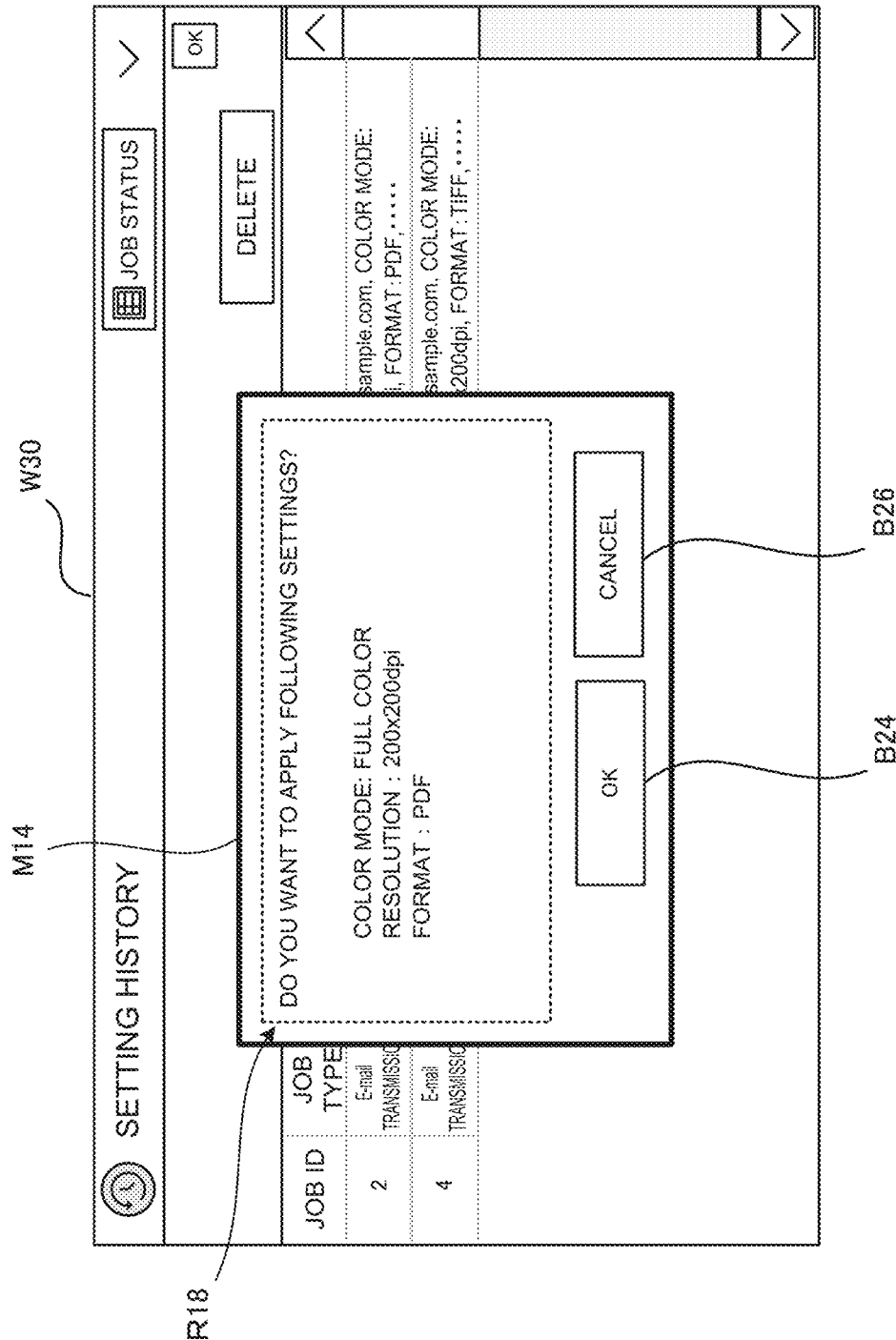
FIG. 13 is a diagram illustrating an operation example according to the first embodiment.

FIG. 13 illustrates a configuration example of an inquiry screen that inquires, when a specific piece of setting history information is selected by the user, whether a setting value pertaining to the setting history information is applied to execution of a job. An inquiry screen M14 includes a selected setting history information display area R18, an OK button B24, and a cancel button B26.

The selected setting history information display area R18 is an area that displays a content of inquiring whether a setting value of setting history information selected by the user via the search result display area R16 is applied to execution of a job. FIG. 13 illustrates a case where setting history information of the job ID "2" is selected in the search result display area R16.

The OK button B24 is a button that accepts an instruction to determine application of a setting value of setting history information displayed in the selected setting history information display area R18. When the OK button B24 is pressed, the controller 11 displays a job execution screen to which a setting value of the setting history information is applied.

The cancel button B26 is a button that accepts an instruction to cancel application of a setting value of setting history information displayed in the selected setting history information display area R18. When the cancel button B26 is pressed, the controller 11 returns the display to the setting history information display screen W30, the destination display screen W20, or the like.

Figure 14:
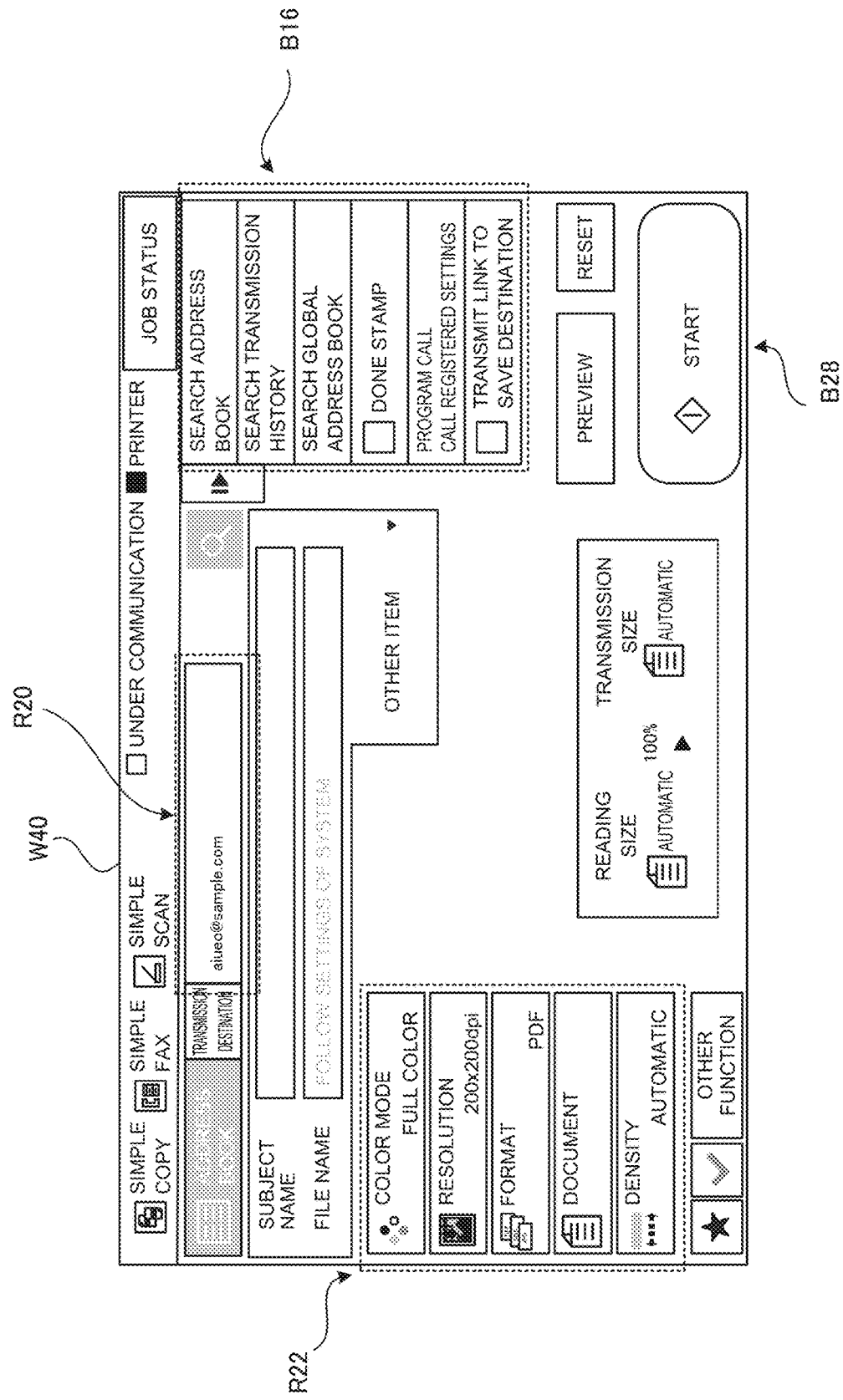
FIG. 14 is a diagram illustrating an operation example according to the first embodiment.

FIG. 14 illustrates a configuration example of a job execution screen to be displayed by the controller 11 in response to pressing of the OK button B24 on the inquiry screen M14. The controller 11 determines which job, setting history information selected by the user via the search result display area R16 pertains to by referring to a job type, a setting value, and the like included in the setting history information. In the example in FIG. 14, setting history information pertaining to the job type "e-mail transmission" is selected by the user, and setting values are those related to a reading operation (image formation) by the image reader 21. Therefore, the controller 11 determines that the job to be executed is a job pertaining to a scan to e-mail function, and displays an execution screen of the job.

A job execution screen W40 includes a transmission destination display area R20, a setting information display area R22, processing selection buttons B16, and a start button B28.

The transmission destination display area R20 is an area that displays a transmission destination of image data in a scan to e-mail function. A destination included in applicable setting history information is set in the transmission destination display area R20.

The setting information display area R22 is an area that displays each piece of setting information pertaining to a scan to e-mail function. Setting values of setting history information selected by the user via the search result display area R16 are applied and displayed in the setting information display area R22. FIG. 14 illustrates an example in which setting values included in setting history information of the job ID "2", namely, a color mode: full color, a resolution: 200×200 dpi. a format: PDF, and the like are applied.

The processing selection buttons B16 are buttons that accept selection of processing desired by the user. The processing selection buttons B16 can have the same configuration as the processing selection buttons B16 described in the destination display screen W20. The processing selection buttons B16 include a "search address book" button, a "search transmission history" button, a "search global address book" button, and the like. For example, by pressing the "search address book" button, the user can switch a transmission destination displayed in the transmission destination display area R20 to a destination based on destination information (address book) managed by the multifunction machine 10. This also allows the user to transmit image data to a different transmission destination, while using desired setting values of setting history information.

As described above, according to the first embodiment, in a case where a storage stores history information in which a destination acquired from a terminal device is a transmission destination, a multifunction machine applies setting values of the history information to a job, and displays, on a displayer, an execution screen pertaining to execution of the job. This allows the user to efficiently execute a job based on destination information acquired from the terminal device without repeating a same setting operation.

2. Second Embodiment

A second embodiment has a configuration in which setting history information that holds attached data similar to a document reading result is selected by collating a reading result (image data) of an attached document with the attached data held in the setting history information.

2.1 Functional Configuration

Figure 15:
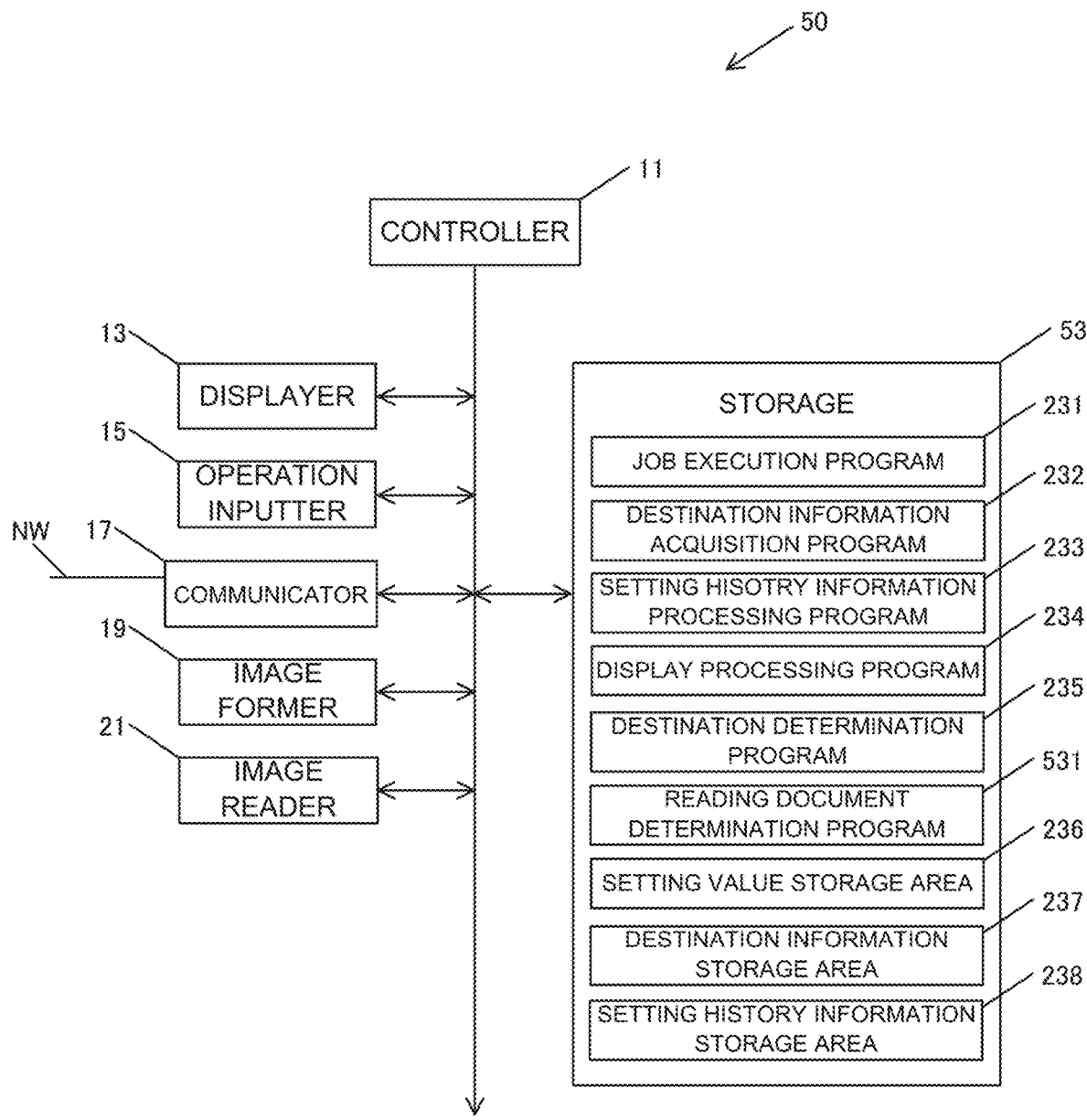
FIG. 15 is a diagram illustrating a functional configuration of a multifunction machine according to a second embodiment.

FIG. 15 is a functional configuration diagram illustrating a functional configuration of a multifunction machine 50 according to the second embodiment. Note that, a same component as that of the multifunction machine 10 according to the first embodiment is indicated with a same reference sign, and description thereof may be omitted. Further, since a terminal device can have a same configuration as that of the terminal device 30 according to the first embodiment, description thereof is omitted herein.

The multifunction machine 50 includes a controller 11, a displayer 13, an operation inputter 15, a communicator 17, an image former 19, an image reader 21, and a storage 53.

In the second embodiment, the storage 53 stores a job execution program 231, a destination information acquisition program 232, a setting history information processing program 233, a display processing program 234, a destination determination program 235, and a reading document determination program 531, and secures a setting value storage area 236, a destination information storage area 237, and a setting history information storage area 238.

The reading document determination program 531 is a program to be read by the controller 11, when determining whether there is setting history information that holds attached data that match or are similar to a reading result by collating a document reading result (image data) by the image reader 21 with the attached data held in the setting history information. When the controller 11 that has read the reading document determination program 531 determines that there is setting history information that holds attached data that match or are similar to a reading result, the controller 11 preferentially displays the setting history information.

FIG. 16 is a diagram illustrating a configuration of setting history information according to the second embodiment. Setting history information according to the second embodiment includes, in addition to a configuration of setting history information illustrated in FIG. 4, for example, setting history information that holds attached data transmitted in connection with e-mail transmission. Note that, the attached data may be data stored in the form of electronic data (e.g., a PDF file or the like) of a transmitted document in a fax transmission job, or attached data in an IFAX transmission job. For example, description is made based on a premise that setting history information of the job ID "2" holds data B (image data) as attached data, and setting history information of the job ID "4" holds data A (image data) as attached data.

2.2 Flow of Processing

Figure 17:
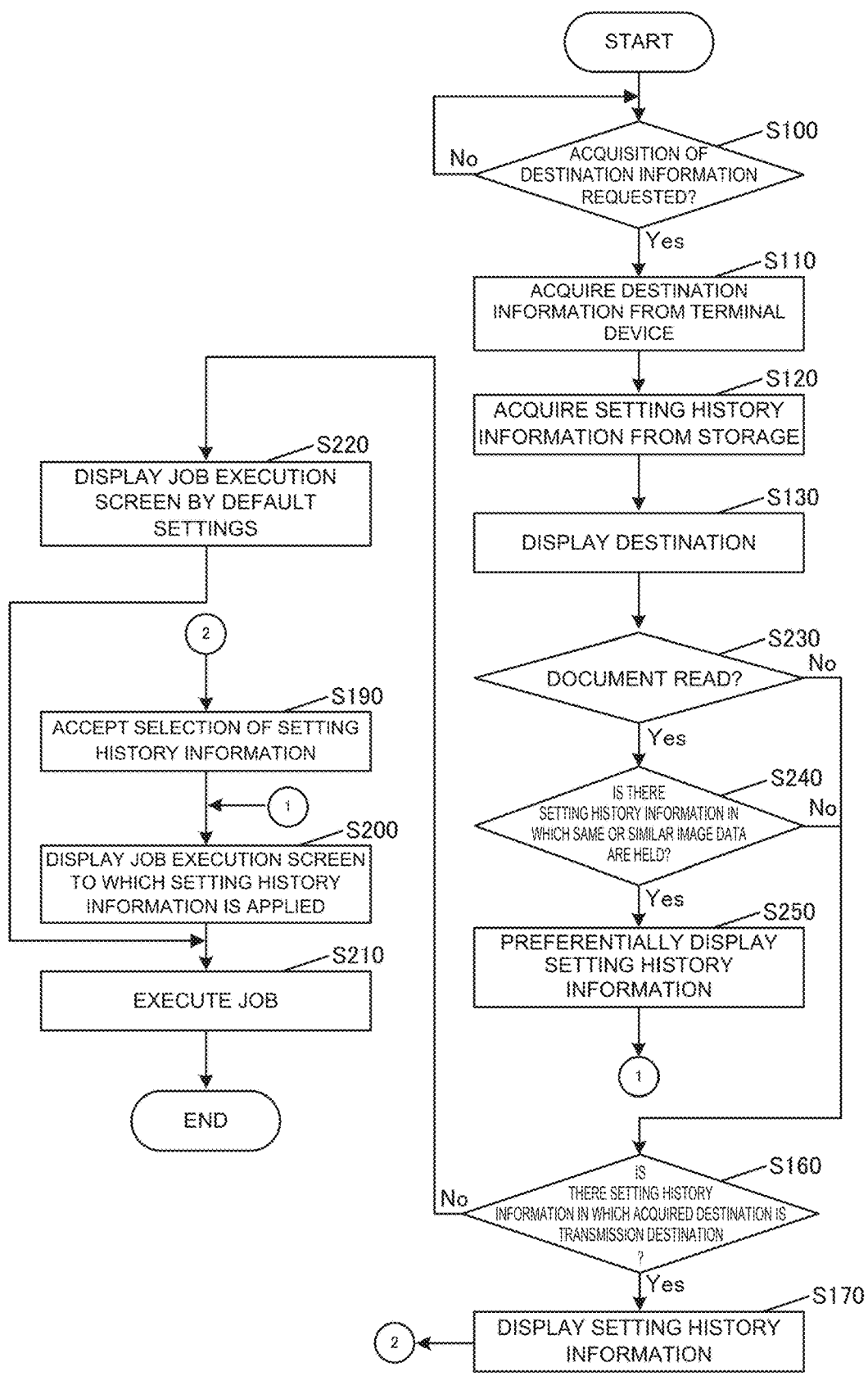
FIG. 17 is a flowchart illustrating a flow of processing according to the second embodiment.

Next, a flow of processing according to the second embodiment is described. FIG. 17 is a flowchart illustrating a flow of processing by the multifunction machine 50. Note that, in processing according to the second embodiment, processing identical to that of the first embodiment is indicated with a same reference sign and description thereof may be omitted. The controller 11 of the multifunction machine 50 achieves processing in each step by reading the job execution program 231, the destination information acquisition program 232, the setting history information processing program 233, the display processing program 234, the destination determination program 235, or the reading document determination program 531.

After executing processing pertaining to Step S100 to Step S130, the controller 11 determines whether a document has been read by the image reader 21 (Step S230).

When it is determined that a document has been read by the image reader 21, the controller 11 determines whether there is setting history information that holds attached data that match or are similar to image data being a document reading result (Step S230; Yes→Step S240).

When it is determined that there is setting history information that holds attached data that match or are similar to image data being a document reading result, the controller 11 preferentially displays the setting history information (Step S240; Yes→Step S250), and proceeds the processing to Step S200. Note that, for collation of image data being a document reading result with attached data held in setting history information, for example, character recognition by optical character recognition (OCR), combination of the character recognition and machine learning, a layout analysis in which an area such as a sentence, a table, and a figure is extracted, and the like can be used.

On the other hand, when it is determined that a document has not been read by the image reader 21 (Step S230; No), and when it is determined that there is no setting history information that holds attached data that match or are similar to image data being a document reading result (Step S240; No), the controller 11 determines whether there is transmission history information in which an acquired destination is a transmission destination (Step S160). When there is associated destination information, the controller 11 displays the setting history information on the displayer 13 (Step S160; Yes→Step S170), and proceeds the processing to Step S190.

Note that, when it is determined that there is no setting history information in which an acquired destination is a transmission destination, the controller 11 displays a job execution screen to which default settings are applied (Step S160; No→Step S220), and proceeds the processing to Step S210.

2.3 Operation Example

Figure 18:
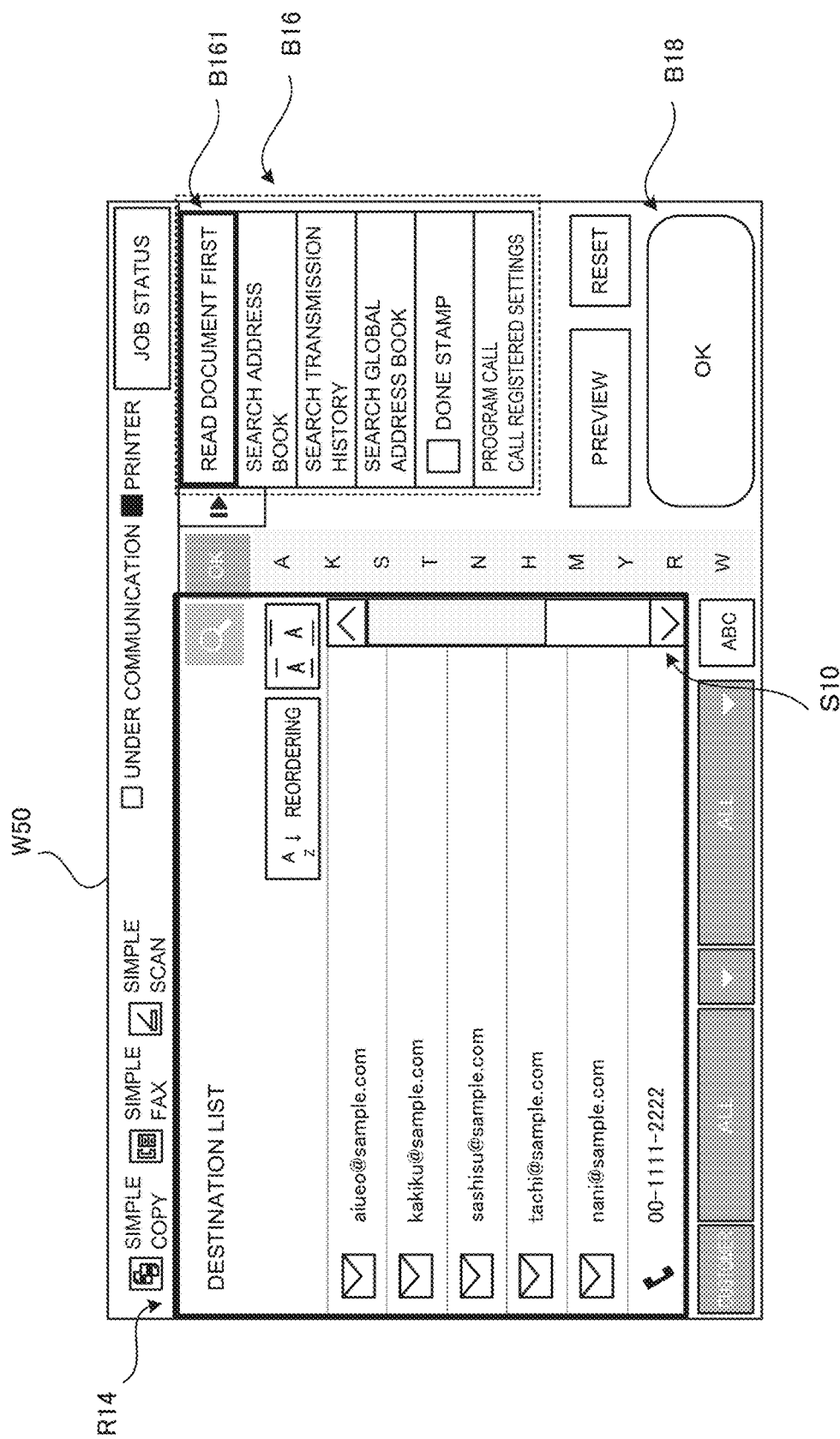
FIG. 18 is a diagram illustrating an operation example according to the second embodiment.

Next, an operation example of the second embodiment is described. FIG. 18 illustrates a configuration example of a destination display screen W50 according to the second embodiment. The destination display screen W50 includes, in addition to the configuration of the destination display screen W20 according to the first embodiment, a "read document first" button B161.

The destination display screen W50 displays a destination included in destination information acquired from a terminal device 30 in the destination display area R14 in a similar manner to the destination display screen W20. By pressing the "read document first" button B161 in a state that a destination is displayed in the destination display area R14, the user can start reading the document.

Note that, when document reading is not performed, the user can execute destination determination processing of determining whether there is transmission history information in which an acquired destination is a transmission destination by pressing the OK button B18.

Figure 19:
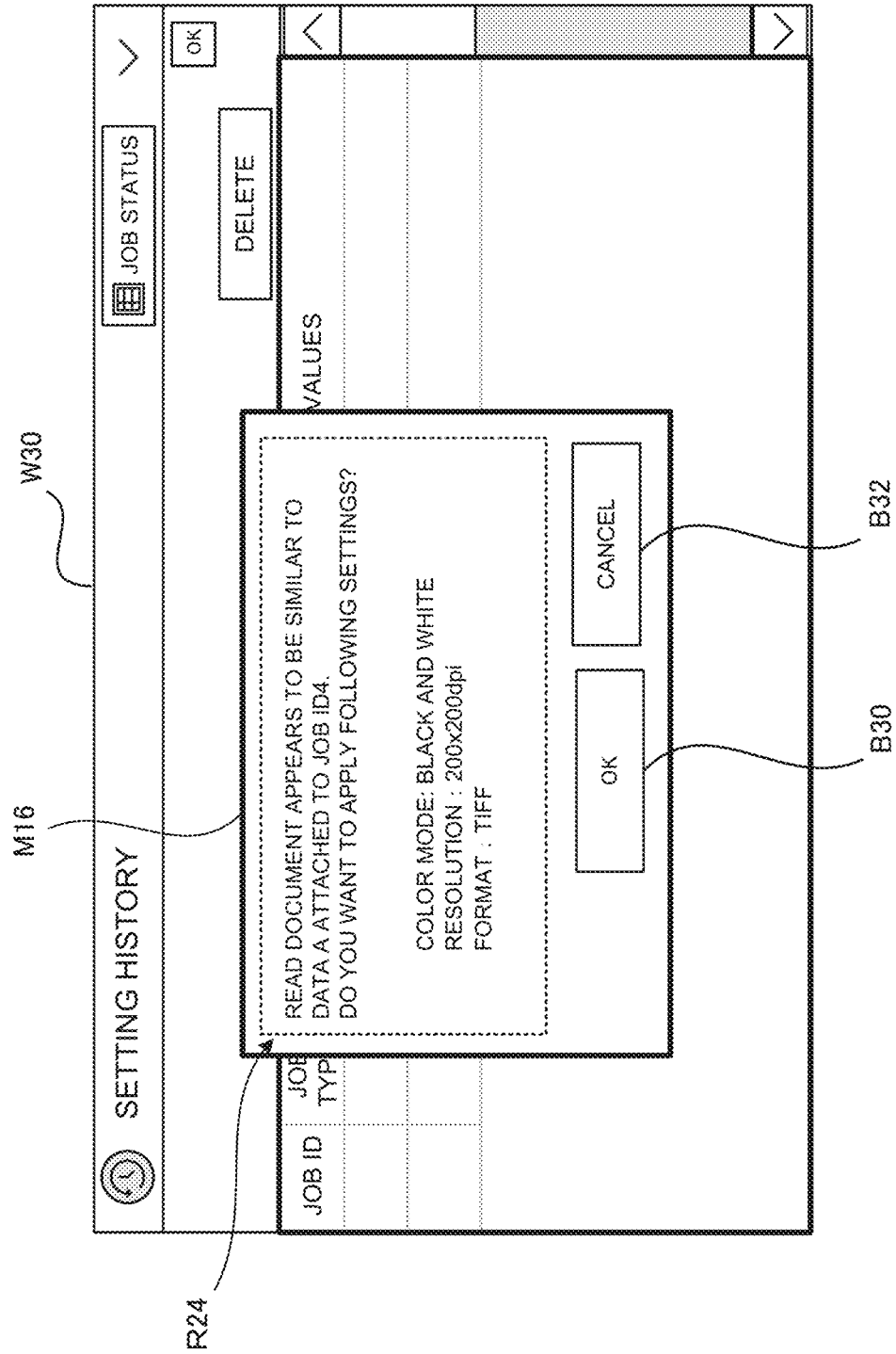
FIG. 19 is a diagram illustrating an operation example according to the second embodiment.

FIG. 19 illustrates a configuration example of a preferential display screen to be displayed by the controller 11, when it is determined that there is setting history information that holds attached data that match or are similar to image data being a document reading result.

The preferential display screen can be configured as an inquiry screen that inquires as to whether a setting value pertaining to setting history information that is determined to be an object to be preferentially displayed is applied to execution of a job. An inquiry screen M16 includes a preferential setting history information display area R24, an OK button B30, and a cancel button B32.

The preferential setting history information display area R24 is an area that displays a content of inquiring whether a setting value of setting history information that holds attached data that match or are similar to image data being a document reading result is applied to execution of a job. The example in FIG. 19 is an example in which data A attached to the job ID "4" are determined to be attached data that match or are similar to image data being a document reading result, and setting values of setting history information of the job ID "4" that holds the data A are displayed.

The OK button B30 is a button that accepts an instruction to determine application of setting values of setting history information displayed in the preferential setting history information display area R24. When the OK button B30 is pressed, the controller 11 displays a job execution screen to which setting values of the setting history information are applied.

The cancel button B32 is a button that accepts an instruction to cancel application of setting values of preferential setting history information displayed in the preferential setting history information display area R24. When the cancel button B32 is pressed, the controller 11 returns the display to the destination display screen W50 or the like.

Figure 20:
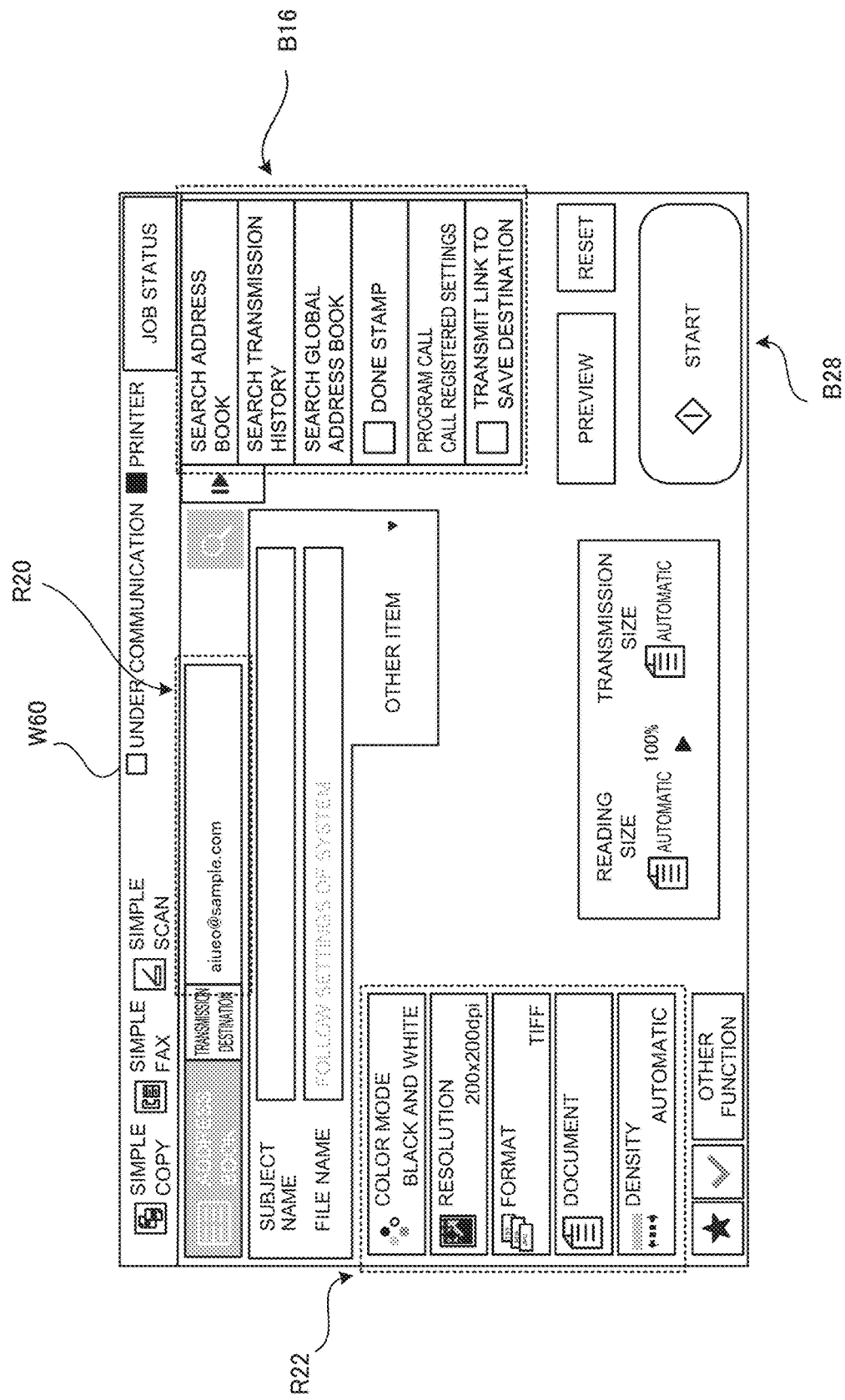
FIG. 20 is a diagram illustrating an operation example according to the second embodiment.

FIG. 20 illustrates a configuration example of a job execution screen to be displayed by the controller 11 in response to pressing of the OK button B30 on the inquiry screen M16. A job execution screen W60 can have the same configuration as that of the job execution screen W40 according to the first embodiment.

Setting values of preferential setting history information displayed in the preferential setting history information display area R24 on the inquiry screen M16 are applied and displayed in the setting information display area R22 on the job execution screen W60. FIG. 20 illustrates an example in which setting values included in the job ID "4", namely, a color mode: black and white, a resolution: 200×200 dpi, a format: TIFF, and the like are applied.

As described above, according to the second embodiment, for example, when a user wants to re-send data in a standard format, such as an invoice, to a same destination, by reading the invoice as a document, setting values of setting history information that holds attached data that match or are similar to image data of the invoice can be applied to a job. This allows the user to efficiently execute a job based on destination information acquired from a terminal device without repeating a same setting operation.

3. Third Embodiment

Next, a third embodiment is described. The third embodiment is an embodiment in which a search target of setting history information is limited depending on an authentication status with respect to a multifunction machine 10 or 50 (hereinafter, simply referred to as a multifunction machine).

Figure 21:
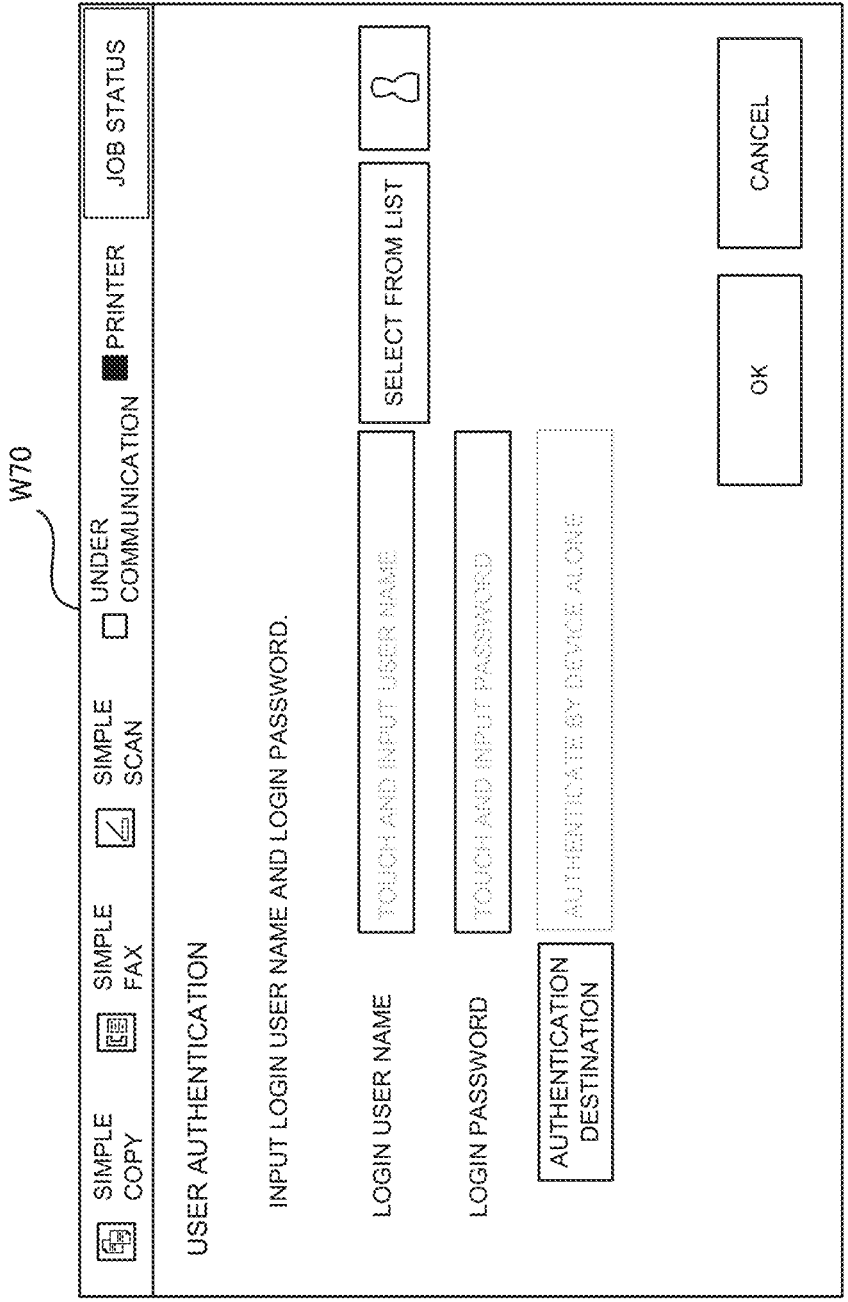
FIG. 21 is a diagram illustrating an operation example according to a third embodiment.

For example, it is possible to install, in a multifunction machine, a user authentication function such as a user authentication screen W70 illustrated in FIG. 21, and limit setting history information to be searched depending on an authentication result of a user. In this case, a controller 11 is able to reduce load of search processing in a multifunction machine, and also shorten a search time by setting, as a search target, only setting history information pertaining to a job executed by an authenticated user in Step S160 in FIG. 7. On the other hand, by prohibiting a user who cannot be authenticated from searching setting history information, or by limiting a range of search to setting history information pertaining to jobs executed by general users other than authenticated users, it is possible to improve security, in addition to the advantageous effects of the first and second embodiments.

The present invention is not limited to the above-described embodiments, and various changes are available. Specifically, embodiments to be acquired by appropriately combining modified technical means within a range that does not depart from the gist of the present invention are also included in the technical scope of the present invention.

In addition, although some of the above-described embodiments are described separately for convenience of explanation, it is needless to say that it is possible to combine and implement the embodiments within a technically possible range.

In addition, a program operating in each device in the embodiments is a program (a program causing a computer to function) that controls a CPU or the like in such a way as to achieve functions of the above-described embodiments. Information to be handled by these devices is temporarily stored in a temporary storage device (e.g., a RAM) at the time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disk (BD), and the like), a magnetic recording medium (e.g., a magnetic tape, a flexible disk, and the like), and the like. In addition, not only functions of the above-described embodiments are achieved by executing a loaded program, but also functions of the present invention may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present invention.

What is claimed is:

1. An information processing apparatus comprising:
one or more controllers that execute a job using a destination; and
one or more memories that store a setting value of the job, as history information, wherein
the one or more controllers acquire the destination used by one or more applications executable on a terminal device, and apply the setting value to execution of the job when the one or more controllers determine that the history information of the job, in which the destination acquired from the terminal device is a transmission destination, is stored in the one or more memories by comparing the destination acquired from the terminal device with a destination in the history information stored in the one or more memories.

2. The information processing apparatus according to claim 1, further comprising a displayer, wherein
the one or more controllers display, on the displayer, the setting value by applying the setting value to an execution screen pertaining to the execution of the job.

3. The information processing apparatus according to claim 2, wherein
when there is a plurality of destinations acquired from the terminal device, the one or more controllers display, on the displayer, a screen that accepts selection of the destination to be searched in the one or more memories.

4. The information processing apparatus according to claim 2, wherein
the one or more controllers display, on the displayer, a screen that accepts selection of the history information when there is a plurality of pieces of the history information stored in the one or more memories.

5. The information processing apparatus according to claim 2, further comprising:
an image scanner that generates image information by reading a document, wherein
when the history information includes information that is the same as or similar to the image information stored in the one or more memories, the one or more controllers display, on the displayer, a screen that accepts selection as to whether the setting value included in the setting history information is applied to the execution screen.

6. The information processing apparatus according to claim 1, wherein
the setting value includes a setting value related to image formation including at least one of a color mode, a paper size, a density, an image quality, a resolution, and a data format.

7. The information processing apparatus according to claim 1, wherein
the one or more controllers execute either one of an e-mail transmission job and a fax transmission job.

8. The information processing apparatus according to claim 4, wherein
the one or more controllers display, on the displayer, the plurality of pieces of the history information based on an accumulation result of a number of times of application of the history information to the execution of the job.

9. An information processing method comprising:
executing a job using a destination;
storing a setting value of the job in one or more memories, as history information;
acquiring the destination used by one or more applications executable on a terminal device;
determining whether the history information of the job, in which the destination acquired from the terminal device is a transmission destination, is stored in the one or more memories by comparing the destination acquired from the terminal device with a destination in the history information stored in the one or more memories; and
applying the setting value to execution of the job when it is determined that the history information of the job is stored in the one or more memories.

* * * * *